(12) United States Patent
Kubota et al.

(10) Patent No.: US 10,503,018 B2
(45) Date of Patent: Dec. 10, 2019

(54) DISPLAY DEVICE AND ELECTRONIC DEVICE

(71) Applicant: Semiconductor Energy Laboratory Co., Ltd., Atsugi-shi, Kanagawa-ken (JP)

(72) Inventors: Daisuke Kubota, Atsugi (JP); Yusuke Kubota, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/033,716

(22) Filed: Jul. 12, 2018

(65) Prior Publication Data

US 2018/0321559 A1 Nov. 8, 2018

Related U.S. Application Data

(62) Division of application No. 14/290,258, filed on May 29, 2014, now abandoned.

(30) Foreign Application Priority Data

Jun. 5, 2013 (JP) ................................ 2013-118550
Jun. 11, 2013 (JP) ................................ 2013-122849
Feb. 27, 2014 (JP) ................................ 2014-037205

(51) Int. Cl.
*G02F 1/1337* (2006.01)
*G02F 1/1362* (2006.01)
*G02F 1/1339* (2006.01)

(52) U.S. Cl.
CPC .... *G02F 1/133707* (2013.01); *G02F 1/13394* (2013.01); *G02F 1/136213* (2013.01)

(58) Field of Classification Search
CPC ................................................ G02F 1/136227
See application file for complete search history.

(56) References Cited

U.S. PATENT DOCUMENTS 5,731,856 A    3/1998   Kim et al.
5,744,864 A    4/1998   Cillessen et al.
(Continued)

FOREIGN PATENT DOCUMENTS

CN    102156368 A    8/2011
CN    102157564 A    8/2011
(Continued)

OTHER PUBLICATIONS

Coates.D et al., "Optical Studies of the Amorphous Liquid-Cholesteric Liquid Crystal Transion:The "Blue Phase"", Physics Letters, Sep. 10, 1973, vol. 45A, No. 2, pp. 115-116.

(Continued)

*Primary Examiner* — Sang V Nguyen
(74) *Attorney, Agent, or Firm* — Robinson Intellectual Property Law Office; Eric J. Robinson

(57) ABSTRACT

A display device having less defective alignment is provided. A display device having a high aperture ratio and including a capacitor which can increase charge capacity is also provided. A display device having a high aperture ratio, including a capacitor with large charge capacity, and having less defective alignment is also provided. A display device includes a pixel in a region defined by a scan line, a data line, and a capacitor line. The pixel includes a liquid crystal layer between a counter electrode and a pixel electrode, a spacer in the liquid crystal layer, and a transistor connected to the pixel electrode. The pixel electrode has a depressed portion, and alignment in the liquid crystal layer is controlled by the depressed portion and the spacer.

8 Claims, 24 Drawing Sheets

(56) References Cited

U.S. PATENT DOCUMENTS

| | | |
|---|---|---|
| 5,808,315 A | 9/1998 | Murakami et al. |
| 5,847,410 A | 12/1998 | Nakajima |
| 6,294,274 B1 | 9/2001 | Kawazoe et al. |
| 6,424,402 B1 | 7/2002 | Kishimoto |
| 6,563,174 B2 | 5/2003 | Kawasaki et al. |
| 6,586,346 B1 | 7/2003 | Yamazaki et al. |
| 6,693,697 B2 | 2/2004 | Sakamoto et al. |
| 6,727,522 B1 | 4/2004 | Kawasaki et al. |
| 6,784,949 B1 | 8/2004 | Nagata et al. |
| 6,960,812 B2 | 11/2005 | Yamazaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,250,991 B2 | 7/2007 | Nagata et al. |
| 7,282,782 B2 | 10/2007 | Hoffman et al. |
| 7,297,977 B2 | 11/2007 | Hoffman et al. |
| 7,301,211 B2 | 11/2007 | Yamazaki et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,459,723 B2 | 12/2008 | Okada et al. |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,626,669 B2 | 12/2009 | Lim et al. |
| 7,674,650 B2 | 3/2010 | Akimoto et al. |
| 7,714,948 B2 | 5/2010 | Yagi et al. |
| 7,732,819 B2 | 6/2010 | Akimoto et al. |
| 7,768,584 B2 | 8/2010 | Yagi et al. |
| 7,989,815 B2 | 8/2011 | Yamazaki et al. |
| 8,089,571 B2 | 1/2012 | Yagi et al. |
| 8,093,589 B2 | 1/2012 | Sugihara et al. |
| 8,102,476 B2 | 1/2012 | Son et al. |
| 8,324,027 B2 | 12/2012 | Yamazaki et al. |
| 8,368,066 B2 | 2/2013 | Yamazaki et al. |
| 8,389,988 B2 | 3/2013 | Yamazaki et al. |
| 8,441,011 B2 | 5/2013 | Yamazaki et al. |
| 8,476,625 B2 | 7/2013 | Kimura |
| 8,648,975 B2 | 2/2014 | Saitoh |
| 8,685,803 B2 | 4/2014 | Chikama et al. |
| 8,692,258 B2 | 4/2014 | Kim et al. |
| 8,736,779 B2 | 5/2014 | Horiuchi et al. |
| 8,953,112 B2 | 2/2015 | Miyake |
| 9,230,994 B2 | 1/2016 | Miyake |
| 9,261,746 B2 | 2/2016 | Uchida et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0094615 A1 | 5/2003 | Yamazaki et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0125280 A1* | 7/2004 | Kim ................ G02F 1/13439 349/110 |
| 2004/0127038 A1 | 7/2004 | Carcia et al. |
| 2004/0169991 A1* | 9/2004 | Nagata ............. H01L 27/14609 361/301.1 |
| 2005/0017302 A1 | 1/2005 | Hoffman |
| 2005/0199959 A1 | 9/2005 | Chiang et al. |
| 2005/0286003 A1 | 12/2005 | Lee et al. |
| 2006/0033871 A1 | 2/2006 | Kim |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0072439 A1 | 3/2007 | Akimoto et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0068525 A1 | 3/2008 | Ishii |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0203387 A1 | 8/2008 | Kang et al. |
| 2008/0224133 A1 | 9/2008 | Park et al. |
| 2008/0251797 A1* | 10/2008 | Chang ............... G02F 1/136213 257/88 |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2008/0308796 A1 | 12/2008 | Akimoto et al. |
| 2008/0308797 A1 | 12/2008 | Akimoto et al. |
| 2008/0308804 A1 | 12/2008 | Akimoto et al. |
| 2008/0308805 A1 | 12/2008 | Akimoto et al. |
| 2008/0308806 A1 | 12/2008 | Akimoto et al. |
| 2009/0008639 A1 | 1/2009 | Akimoto et al. |
| 2009/0065771 A1 | 3/2009 | Iwasaki et al. |
| 2009/0068773 A1 | 3/2009 | Lai et al. |
| 2009/0073325 A1 | 3/2009 | Kuwabara et al. |
| 2009/0101895 A1 | 4/2009 | Kawamura et al. |
| 2009/0114910 A1 | 5/2009 | Chang |
| 2009/0134399 A1 | 5/2009 | Sakakura et al. |
| 2009/0141203 A1 | 6/2009 | Son et al. |
| 2009/0146150 A1 | 6/2009 | Hosoya |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2009/0283762 A1 | 11/2009 | Kimura |
| 2010/0025678 A1 | 2/2010 | Yamazaki et al. |
| 2010/0065839 A1 | 3/2010 | Yamazaki et al. |
| 2010/0065840 A1 | 3/2010 | Yamazaki et al. |
| 2010/0065844 A1 | 3/2010 | Tokunaga |
| 2010/0072470 A1 | 3/2010 | Yamazaki et al. |
| 2010/0072471 A1 | 3/2010 | Yamazaki et al. |
| 2010/0092800 A1 | 4/2010 | Itagaki et al. |
| 2010/0097359 A1 | 4/2010 | Yamada et al. |
| 2010/0097553 A1 | 4/2010 | Shoraku et al. |
| 2010/0109002 A1 | 5/2010 | Itagaki et al. |

(56) References Cited

U.S. PATENT DOCUMENTS

| | | | |
|---|---|---|---|
| 2010/0149477 A1* | 6/2010 | Nagami | G02F 1/1339 349/138 |
| 2010/0163868 A1* | 7/2010 | Yamazaki | H01L 27/1225 257/43 |
| 2010/0163874 A1 | 7/2010 | Koyama et al. | |
| 2011/0032435 A1 | 2/2011 | Kimura | |
| 2011/0085104 A1 | 4/2011 | Arasawa et al. | |
| 2011/0140205 A1 | 6/2011 | Sakata et al. | |
| 2011/0242073 A1 | 10/2011 | Horiuchi et al. | |
| 2011/0303953 A1 | 12/2011 | Kamata | |
| 2011/0309362 A1* | 12/2011 | Yoon | G02F 1/136213 257/59 |
| 2012/0062811 A1 | 3/2012 | Miyake | |
| 2012/0081274 A1* | 4/2012 | Chang | G02F 1/136259 345/92 |
| 2012/0113343 A1 | 5/2012 | Konno et al. | |
| 2012/0147306 A1 | 6/2012 | Moriya et al. | |
| 2012/0229724 A1* | 9/2012 | Miyairi | C09K 19/0275 349/43 |
| 2012/0241750 A1* | 9/2012 | Chikama | H01L 27/1225 257/71 |
| 2012/0298988 A1 | 11/2012 | Hara et al. | |
| 2012/0319107 A1* | 12/2012 | Miyake | G02F 1/136213 257/43 |
| 2013/0057795 A1 | 3/2013 | Kesho et al. | |
| 2013/0215341 A1 | 8/2013 | Rho et al. | |
| 2013/0321725 A1* | 12/2013 | Hirosawa | G02F 1/134363 349/37 |
| 2014/0167031 A1 | 6/2014 | Choi et al. | |
| 2014/0175432 A1 | 6/2014 | Yamazaki et al. | |
| 2014/0313446 A1 | 10/2014 | Kubota | |

FOREIGN PATENT DOCUMENTS

| | | |
|---|---|---|
| CN | 202126557 U | 1/2012 |
| EP | 1037095 A | 9/2000 |
| EP | 1737044 A | 12/2006 |
| EP | 1837842 A | 9/2007 |
| EP | 2192441 A | 6/2010 |
| EP | 2226847 A | 9/2010 |
| EP | 2246836 A | 11/2010 |
| EP | 2390718 A | 11/2011 |
| EP | 2511896 A | 10/2012 |
| EP | 2579094 A | 4/2013 |
| EP | 2579237 A | 4/2013 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 07-104312 A | 4/1995 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2000-323698 A | 11/2000 |
| JP | 2001-075086 A | 3/2001 |
| JP | 2002-076356 A | 3/2002 |
| JP | 2002-277899 A | 9/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-077822 A | 3/2005 |
| JP | 2007-096055 A | 4/2007 |
| JP | 2007-123861 A | 5/2007 |
| JP | 2010-085577 A | 4/2010 |
| JP | 2012-083738 A | 4/2012 |
| JP | 2012-226385 A | 11/2012 |
| WO | WO-2004/114391 | 12/2004 |
| WO | WO-2006/064832 | 6/2006 |
| WO | WO-2010/058635 | 5/2010 |
| WO | WO-2011/027602 | 3/2011 |
| WO | WO-2011/070981 | 6/2011 |
| WO | WO-2012/005038 | 1/2012 |
| WO | WO-2013/021607 | 2/2013 |

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 13, pp. 1216-1219.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Kimizuka.N et al., "Spinel,YBFE2O4, and YB2FE3O7 Types of Structures for Compounds in the In2O3 and Sc2O3—A2O3—Bo Systems [A; Fe, Ga. or Al; B: Mg, Mn, Fe, Ni, Cu,Or Zn]at Temperatures Over 1000° C.", Journal of Solid State Chemistry, 1985, vol. 60, pp. 382-384.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Kitzerow.H et al., "Observation of Blue Phases in Chiral Networks", Liquid Crystals, 1993, vol. 14, No. 3, pp. 911-916.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System". Journal of Solid State Chemistry, Apr. 1, 1995, vol. 115, No. 1, pp. 170-178.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Kikuchi.H et al., "Polymer-Stabilized Liquid Crystal Blue Phases", Nature Materials, Sep. 2, 2002, vol. 1, pp. 64-68.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Nomura.K et al., "Thin-Film Transistor Fabricated in Single-Crystalline Transparent Oxide Semiconductor", Science, May 23, 2003, vol. 300, No. 5623, pp. 1269-1272.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Lee.H et al., "Current Status of, Challenges to, and Perspective View of AM-OLED ", IDW '06 : Proceedings of the 13th International Display Workshops, Dec. 7, 2006, pp. 663-666.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hirao.T et al., "Novel Top-Gate Zinc Oxide Thin-Film Transistors (ZnO TFTs) for AMLCDS", J. Soc. Inf. Display (Journal of the

(56) References Cited

OTHER PUBLICATIONS

Society for Information Display), 2007, vol. 15, No. 1, pp. 17-22.
Park.S et al., "Challenge to Future Displays: Transparent AM-OLED Driven by Peald Grown ZnO TFT", IMID '07 Digest, 2007, pp. 1249-1252.
Kikuchi.H et al., "62.2:Invited Paper:Fast Electro-Optical Switching in Polymer-Stabilized Liquid Crystaliline Blue Phases for Display Application", SID Digest '07 : SID International Symposium Digest of Technical Papers, 2007, vol. 88, pp. 1737-1740.
Miyasaka.M, "Suftla Flexible Microelectronics on Their Way to Business", SID Digest '07 : SID International Symposium Digest of Technical Papers, 2007, vol. 38, pp. 1673-1676.
Kurokawa.Y et al., "UHF RFCPUS on Flexible and Glass Substrates for Secure RFID Systems", Journal of Solid-State Circuits , 2008, vol. 43, No. 1, pp. 292-299.
Jeong.J et al., "3.1: Distinguished Paper. 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.
Park.J et al., "Amorphous Indium-Gallium-Zinc Oxide TFTs and Their Application for Large Size AMOLED", AM-FPD '08 Digest of Technical Papers, Jul. 2, 2008, pp. 275-278.
Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.
Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.
Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.
Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Cho.D et al., "21.2:AL and Sn-Doped Zinc Indium Oxide Thin Film Transistors for AMOLED Backplane", SID Digest '09 : SID International Symposium Digest of Technical Papers, May 31, 2009, pp. 280-283.
Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.
Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40, pp. 184-187.
Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers. May 31, 2009, pp. 284-287.
Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.
Osada.T et al., "Development of Driver-Integrated Panel Using Amorphous In—Ga—Zn-Oxide TFT", AM-FPD '09 Digest of Technical Papers, Jul. 1, 2009, pp. 33-36.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Park.J et al., "High performance amorphous oxide thin film transistors with self-aligned top-gate structure", IEDM 09: Technical Digest of International Electron Devices Meeting, Dec. 7, 2009, pp. 191-194.
Nakamura.M, "Synthesis of Homologous Compound with New Long-Period Structure", NIRIM Newsletter, Mar. 1, 1995, vol. 150, pp. 1-4.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.
Orita.M et al., "Mechanism of Electrical Conductivity of Transparent InGaZnO4", Phys. Rev. B (Physical Review. B), Jan. 15, 2000, vol. 61, No. 3, pp. 1811-1816.
Van de Walle.C, "Hydrogen as a Cause of Doping in Zinc Oxide", Phys. Rev. Lett. (Physical Review Letters). Jul. 31, 2000, vol. 85, No. 5, pp. 1012-1015.
Orita.M et al., "Amorphous transparent conductive oxide InGaO3(ZnO)m (m<4):a Zn4s conductor", Philosophical Magazine, 2001, vol. 81, No. 5, pp. 501-515.
Janotti.A et al., "Oxygen Vacancies in ZnO", Appl. Phys. Lett. (Applied Physics Letters) , 2005, vol. 87, pp. 122102-1-122102-3.
Clarks et al., "First Principles Methods Using Castep", Zeitschrift fur Kristallographie, 2005, vol. 220, pp. 567-570.
Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 55, pp. 4303-4303.
Janotti.A et al., "Native Point Defects in ZnO", Phys. Rev. B (Physical Review. B), Oct. 4, 2007, vol. 76, No. 16, pp. 165202-1-165202-22.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.
Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.
Hsieh.H et al., "P-29:Modeling of Amorphous Oxide Semiconductor Thin Film Transistors and Subgap Density of States", SID Digest '08 : SID Enternational Symposium Digest of Technical Papers, May 20, 2008, vol. 39, pp. 1277-1280.
Oba.F et al., "Defect energetics in ZnO: a hybrid Hartree-Fock density functional study", Phys. Rev. B (Physical Review. B), 2008, vol. 77, pp. 245202-1-245202-6.
Kim.S et al., "High-Performance oxide thin film transistors passivated by various gas plasmas", 214th ECS Meeting, 2008, No. 2317, ECS.
Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.
Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-536.
Park.S et al., "42.3: Transparent ZnO Thin Film Transistor for the Application of High Aperture Ratio Bottom Emission AM-OLED

(56) References Cited

OTHER PUBLICATIONS

Dismay", SID Digest '08 : SID International Symposium Digestdf Technical Papers, May 20, 2008, vol. 39, pp. 529-532.
Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.
Mo.Y et al., "Amorphous Oxide TFT Backplanes for Large Size AMOLED Displays", IDW '08 : Proceedings of the 6th International Display Workshops, Dec. 3, 2008, pp. 581-584.
Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.
Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.
Oh.M et al., "Improving the Gate Stability of ZnO Thin-Film Transistors With Aluminum Oxide Dielectric Layers", J. Electrochem. Soc. (Journal of The Electrochemical Society), 2008, vol. 155, No. 12. pp. H1009-H1014.
Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Ueno.K et al:, "Field-Effect Transistor on SrTiO3 With Sputtered Al2O3 Gate Insulator", Appl. Phys. Lett. (Applied Physics Letters) , Sep. 1, 2003, vol. 83, No. 9, pp. 1755-1757.
Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.
Chinese Office Action (Application No. 201410246494.1) dated Apr. 2, 2018.

\* cited by examiner

DISPLAY DEVICE AND ELECTRONIC DEVICE

BACKGROUND OF THE INVENTION

1. Field of the Invention

The invention disclosed in this specification and the like relates to a display device and an electronic device including the display device.

2. Description of the Related Art

With the recent rapid spread of portable information terminals such as smartphones, improvement in their performance has progressed rapidly. Their screens have been increased in size and resolution, and emphasis has been on power consumption of display devices with increasing screen resolution. A typical example of display devices is a liquid crystal display device including a liquid crystal element. In each of pixels arranged in a matrix in a liquid crystal display device, a transistor serving as a switching element, a liquid crystal element electrically connected to the transistor, a capacitor connected to the liquid crystal element in parallel, and the like are provided.

As a semiconductor material of a semiconductor film of the transistor, a silicon semiconductor such as amorphous silicon or polysilicon (polycrystalline silicon) is generally used.

Metal oxides having semiconductor characteristics (hereinafter referred to as oxide semiconductors) can be used for semiconductor films in transistors. For example, techniques for manufacturing transistors using zinc oxide or an In—Ga—Zn-based oxide semiconductor are disclosed (see Patent Documents 1 and 2).

PATENT DOCUMENTS

[Patent Document 1] Japanese Published Patent Application No. 2007-123861
[Patent Document 2] Japanese Published Patent Application No. 2007-96055

SUMMARY OF THE INVENTION

In a display device, when unevenness such as a step difference around a pixel is large, defective alignment is likely to be caused in a liquid crystal layer. The defective alignment is likely to be caused along, for example, sides of step differences near a scan line and a data line that are connected to a transistor, and a pixel electrode. Thus, part of an opening of a pixel that can be used as a display region needs to be covered with a light-blocking film (what is called a black matrix, and also referred to as BM). Accordingly, an aperture ratio of the pixel is lowered, and image display quality is lowered.

In order to reduce the defective alignment, unevenness such as a step difference due to a transistor or the like is subjected to planarization treatment using an organic resin or the like in many cases.

However, in the case where an oxide semiconductor is used as a semiconductor material included in the transistor, when impurities (typically, moisture or the like) contained in an organic resin enter the oxide semiconductor, the semiconductor characteristics are adversely affected. Thus, it has been necessary to minimize the use of an organic resin in manufacturing a display device.

As the resolution of a display device increases, the size of each pixel decreases and the number of pixels provided in the display device increases. In a high-resolution display device, the size of each pixel is small and yet alignment in all pixels needs to be controlled. Therefore, in the case where alignment in liquid crystal elements is controlled by rubbing treatment, for example, there are problems such as an increase in probability of defective alignment leading to a decrease in yield of display devices.

In the case where the display device includes a capacitor, the capacitor includes a dielectric film between a pair of electrodes at least one of which is formed, in many cases, using a conductive film serving as a gate electrode, a source electrode, a drain electrode, or the like of a transistor. As the capacitance value of the capacitor is increased, a period in which the alignment of liquid crystal molecules of a liquid crystal element can be kept constant in the state where an electric field is applied can be made longer. When the period can be made longer in a display device that displays a still image, the number of times of rewriting image data can be reduced, leading to a reduction in power consumption.

One of methods for increasing the charge capacity of a capacitor is to increase the area occupied by the capacitor, specifically, to increase the area of a portion where a pair of electrodes overlap with each other. However, in the display device, when the area of a conductive film is increased to increase the area of a portion where the electrodes overlap with each other, the aperture ratio of a pixel is lowered and thus image display quality is degraded. In a high-resolution display device, it is difficult to increase the area of a capacitor because the size of each pixel is small.

In view of the above problem, one object of one embodiment of the present invention is to provide a display device having less defective alignment. Further, another object of one embodiment of the present invention is to provide a display device having a high aperture ratio and including a capacitor which can increase charge capacity. Furthermore, another object of one embodiment of the present invention is to provide a display device having a high aperture ratio, including a capacitor with large charge capacity, and having less defective alignment.

One embodiment of the present invention is a display device which includes a pixel in a region defined by a scan line, a data line, and a capacitor line. The pixel includes a liquid crystal layer between a counter electrode and a pixel electrode, a spacer in the liquid crystal layer, and a transistor connected to the pixel electrode. The pixel electrode has a depressed portion, and alignment in the liquid crystal layer is controlled by the depressed portion and the spacer.

Since alignment in the liquid crystal layer is controlled by the spacer and the depressed portion, it is possible to control alignment in the liquid crystal layer without performing rubbing treatment. The spacer and the depressed portion are formed in each pixel independently, and therefore, defective alignment in the liquid crystal layer of each pixel can be reduced even in a high-resolution liquid crystal display device.

Note that the depressed portion of the pixel electrode can be formed by forming an opening in a base film, e.g., an insulating layer before forming the pixel electrode and then forming the pixel electrode along the opening in the insulating layer.

Note that a method for manufacturing a display device that is one embodiment of the present invention is also one embodiment of the present invention.

According to one embodiment of the present invention, a display device having less defective alignment can be provided. Further, a display device having a high aperture ratio and including a capacitor which can increase charge capacity can be provided. Furthermore, a display device having a high aperture ratio, including a capacitor with large charge capacity, and having less defective alignment can be provided.

DETAILED DESCRIPTION OF THE INVENTION

Figure 1:
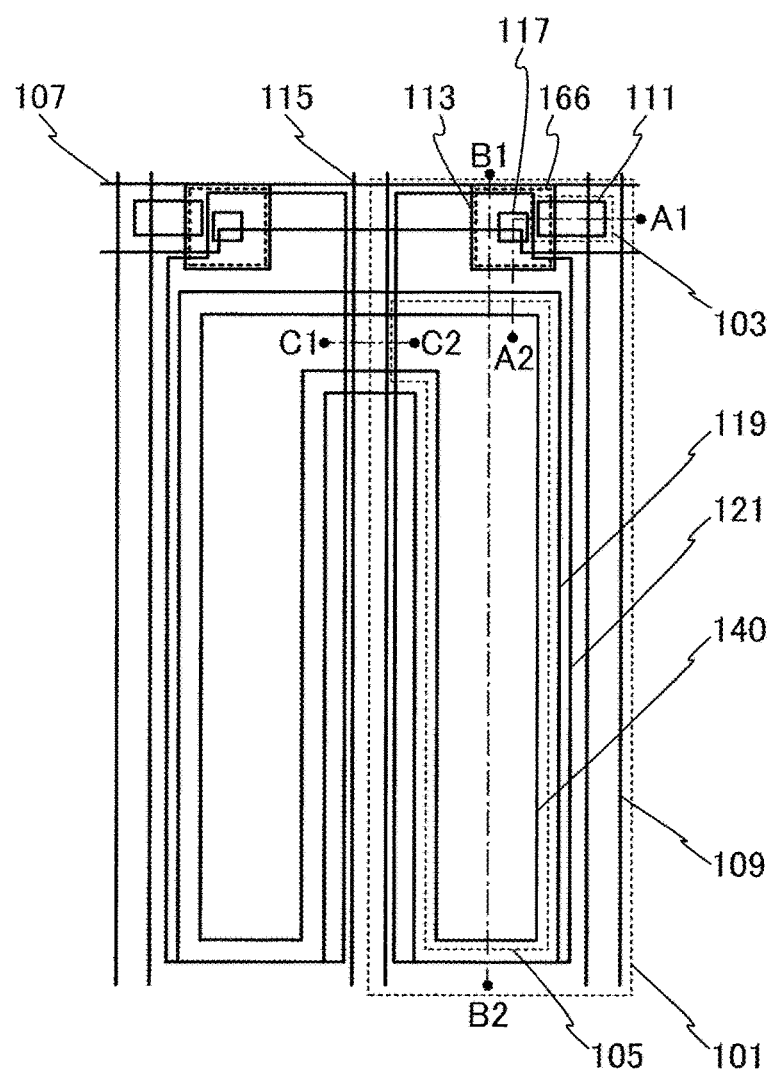
FIG. 1 is a top view illustrating a pixel and its periphery of a display device of one embodiment of the present invention.

Embodiments of the present invention will be described in detail below with reference to drawings. However, the present invention is not limited to the description below, and it is easily understood by those skilled in the art that modes and details disclosed herein can be modified in various ways.

Further, the present invention is not construed as being limited to description of the embodiments.

In the structures of the present invention described below, the same portions or portions having similar functions are denoted by the same reference numerals in different drawings, and description of such portions is not repeated. Further, the same hatch pattern is applied to parts having similar functions, and the parts are not especially denoted by reference numerals in some cases.

In each drawing described in this specification, the size, the film thickness, or the region of each component is exaggerated for clarity in some cases. Therefore, embodiments and examples of the present invention are not necessarily limited to such scales.

Ordinal numbers such as "first" and "second" in this specification and the like are used for convenience and do not denote the order of steps or the stacking order of layers. Therefore, for example, the term "first" can be replaced with the term "second", "third", or the like as appropriate. In addition, the ordinal numbers in this specification and the like are not necessarily the same as the ordinal numbers used to specify one embodiment of the present invention.

Functions of a "source" and a "drain" in the present invention are sometimes replaced with each other when the direction of a current flowing is changed in circuit operation, for example. Therefore, the terms "source" and "drain" can be replaced with each other in this specification.

(Embodiment 1)

In this embodiment, a display device of one embodiment of the present invention is described with reference to FIGS. 1 to 4, FIGS. 5A to 5C, FIGS. 6A and 6B, FIGS. 7A and 7B, FIGS. 8A and 8B, and FIGS. 9 to 11.

<Structural Example of Display Device>

FIG. 1 is a top view of a pixel and its periphery of a display device. Note that in the top view illustrated in FIG. 1, some components are not illustrated in order to avoid complexity of the drawing.

In FIG. 1, a pixel 101 is provided in a region defined by a scan line 107, a data line 109, and a capacitor line 115. The scan line 107 extends in the direction substantially perpendicular to the data line 109 (in the horizontal direction in the drawing). The data line 109 extends in the direction substantially perpendicular to the scan line 107 (in the vertical direction in the drawing). The capacitor line 115 extends in the direction substantially parallel to the data line 109.

A transistor 103 is formed to overlap with the scan line 107 and formed in a region where the scan line 107 intersects with the data line 109. The transistor 103 includes at least a semiconductor layer 111 including a channel formation region, a gate electrode, a gate insulating layer (not illustrated in FIG. 1), a source electrode, and a drain electrode.

The scan line 107 also serves as the gate electrode of the transistor 103, and the data line 109 also serves as the source electrode of the transistor 103. A conductive layer 113 serves as the drain electrode of the transistor 103 and is electrically connected to a pixel electrode 121 through an opening 117. Further, in some cases, the term "scan line 107" is used also to denote the gate electrode of the transistor 103 and the term "data line 109" is used also to denote the source electrode of the transistor 103 in the following description.

A capacitor 105 includes a semiconductor layer 119 having higher conductivity than that of the semiconductor layer 111 included in the transistor 103 and a light-transmitting property, the pixel electrode 121 having a light-transmitting property, and an insulating layer having a light-transmitting property (not illustrated in FIG. 1) which is included in the transistor 103, as a dielectric layer. That is, the capacitor 105 transmits light. Further, the capacitor line 115 is provided over and in contact with the semiconductor layer 119, and the capacitor line 115 is electrically connected to the semiconductor layer 119. An opening 140 is formed over the semiconductor layer 119. The opening 140 is formed by processing an insulating layer (not illustrated in FIG. 1) provided over the semiconductor layer 119. The pixel electrode 121 is formed so as to cover part of the opening 140 and therefore has a depressed portion.

A spacer 166 is provided in the pixel 101, and alignment in a liquid crystal layer is controlled by the spacer 166 and the depressed portion of the pixel electrode 121.

FIG. 1 illustrates two pixels as an example, in which the pixel 101 and the adjacent pixel (the pixel on the left side of the pixel 101 in FIG. 1) share the capacitor line 115. The capacitor 105 in the pixel 101 and that in the adjacent pixel are located symmetrically with respect to the capacitor line 115. Such a layout is preferable because the number of capacitor lines 115 can be reduced and thus the aperture ratio of a high-resolution display device can be increased.

Figure 2:
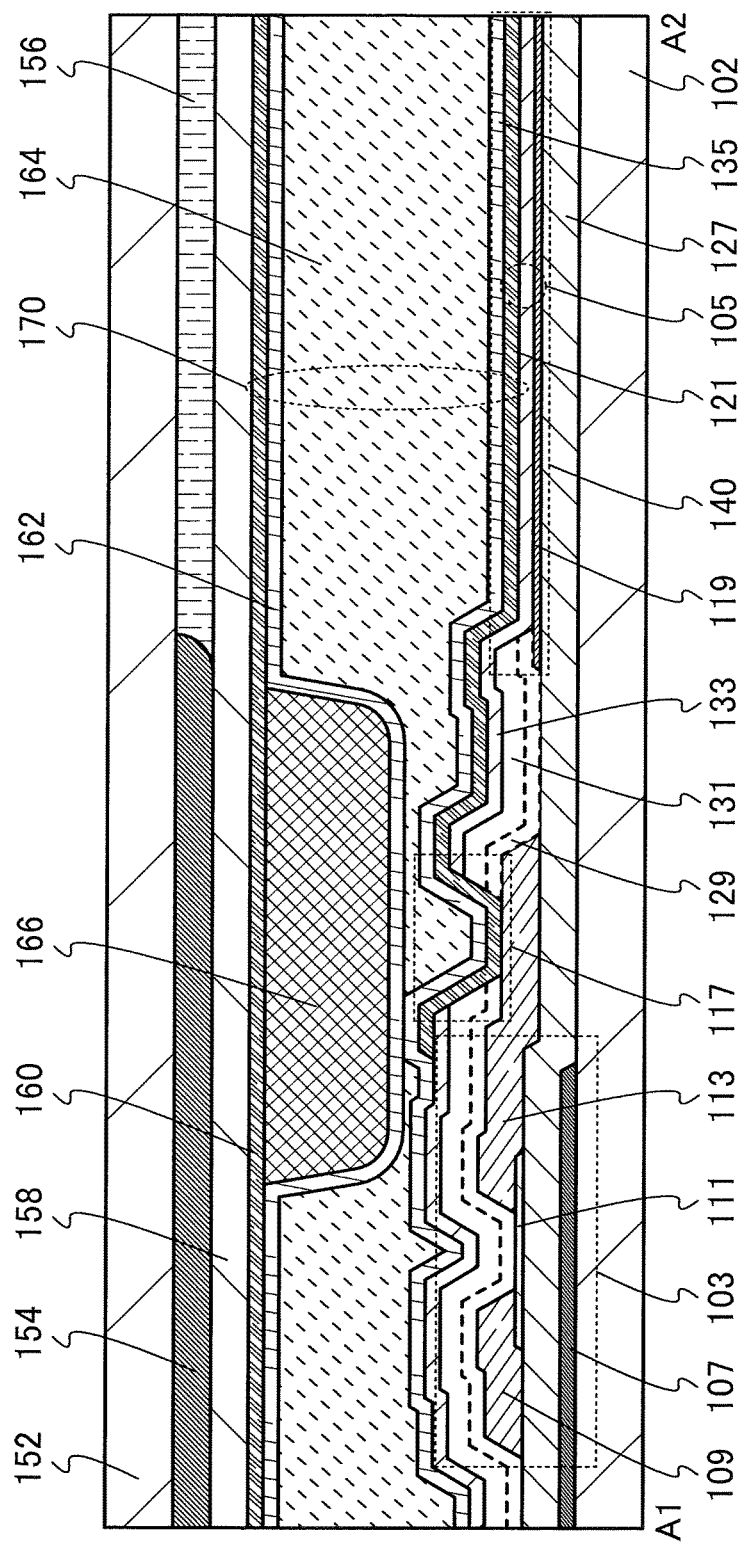
FIG. 2 is a cross-sectional view illustrating a pixel of a display device of one embodiment of the present invention.
Figure 3:
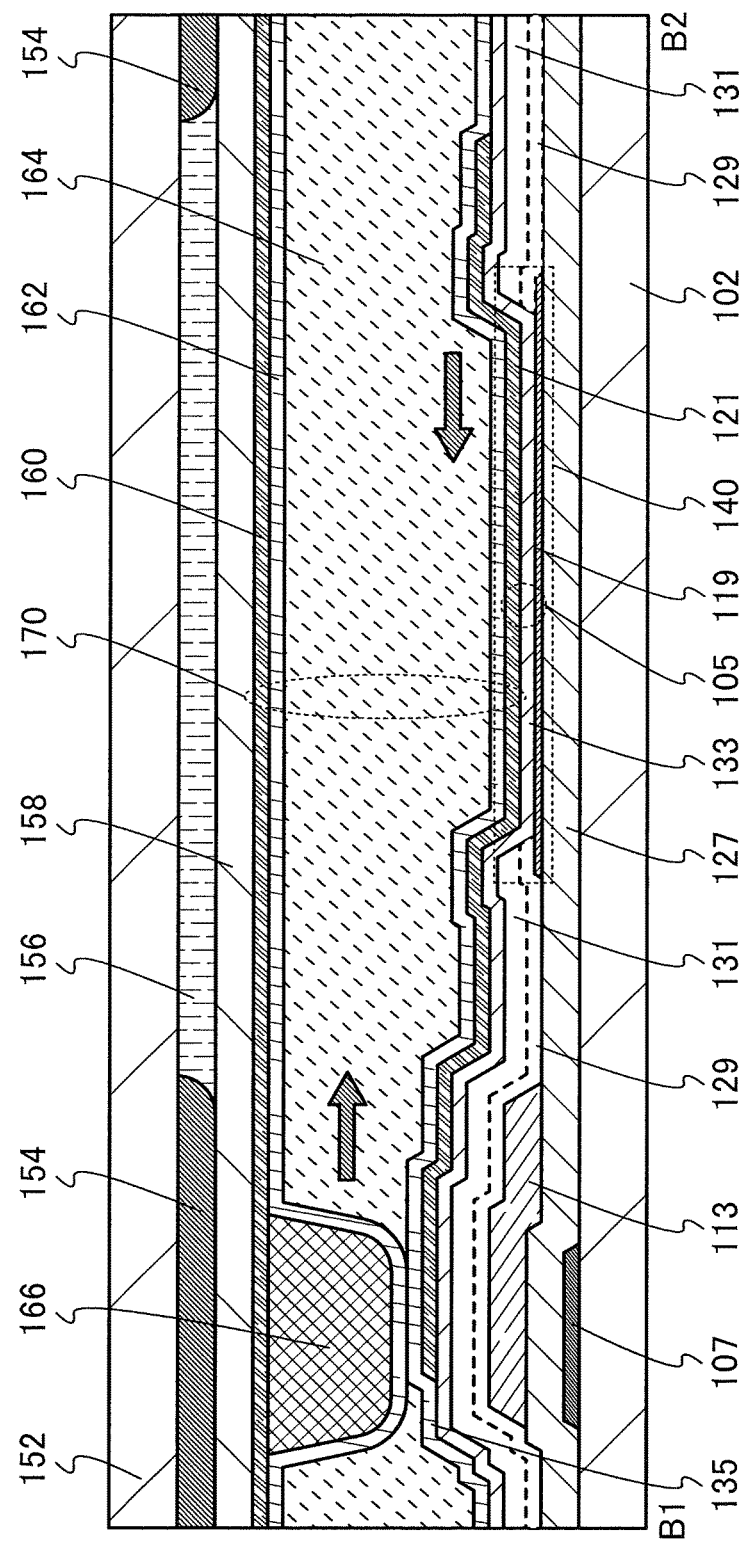
FIG. 3 is a cross-sectional view illustrating a pixel of a display device of one embodiment of the present invention.
Figure 4:
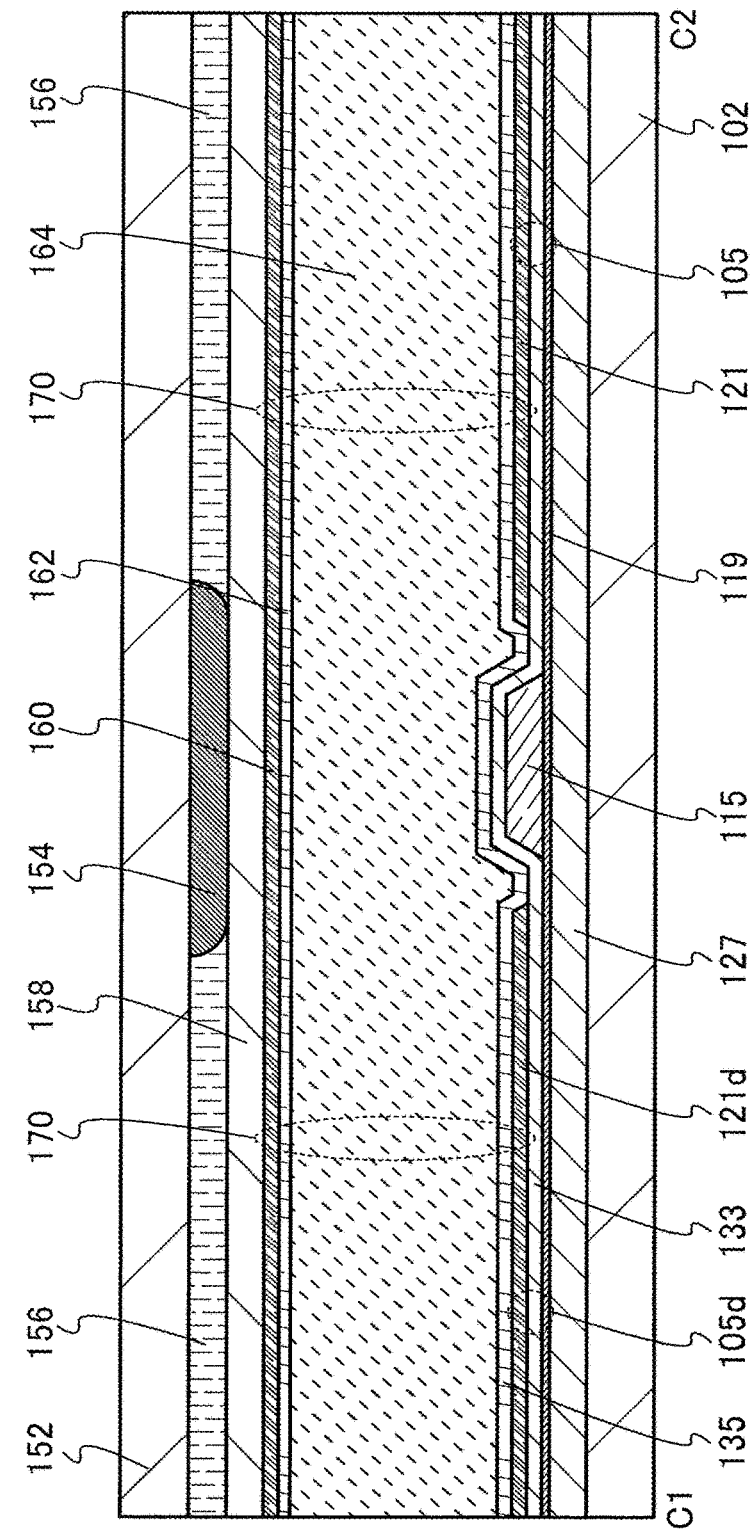
FIG. 4 is a cross-sectional view illustrating a pixel of a display device of one embodiment of the present invention.

Cross-sectional views of the pixel 101 taken along dashed-dotted line A1-A2, dashed-dotted line B1-B2, and dashed-dotted line C1-C2 in FIG. 1 are illustrated in FIG. 2, FIG. 3, and FIG. 4, respectively.

The cross-sectional structure of the display device illustrated in FIG. 2 is described below.

The scan line 107 serving as the gate electrode of the transistor 103 is provided over a substrate 102. An insulating layer 127 serving as the gate insulating layer of the transistor 103 is provided over the scan line 107. The semiconductor layer 111 is provided over the insulating layer 127 so as to overlap with the scan line 107, and serves as a channel formation region of the transistor 103. The semiconductor layer 119 formed in the same step as the semiconductor layer 111 is provided over the insulating layer 127. The data line 109 serving as the source electrode of the transistor 103 and the conductive layer 113 serving as the drain electrode of the transistor 103 are provided over the semiconductor layer 111 and the insulating layer 127. Insulating layers 129 and 131 serving as a protective insulating layer of the transistor 103 are provided over the data line 109, the semiconductor layer 111, the conductive layer 113, the semiconductor layer 119, and the insulating layer 127. The opening 140 reaching the semiconductor layer 119 is provided in the insulating layers 129 and 131 so that part of end portions of the insulating layers 129 and 131 covers an end portion of the semiconductor layer 119. An insulating layer 133 is formed so as to cover the insulating layer 131 and the semiconductor layer 119. The opening 117 reaching the conductive layer 113 is provided in the insulating layers 129, 131, and 133, and the pixel electrode 121 is provided in the opening 117 and over the insulating layer 133. An alignment film 135 is provided over the insulating layer 133 and the pixel electrode 121.

The cross-sectional structure of the display device illustrated in FIG. 3 is described below.

The scan line 107 is provided over the substrate 102. The insulating layer 127 is provided over the scan line 107. The semiconductor layer 119 is provided over the insulating layer 127. The conductive layer 113 is provided over the insulating layer 127 so as to overlap with the scan line 107. The insulating layers 129 and 131 are provided over the insulating layer 127, the semiconductor layer 119, and the conductive layer 113. The opening 140 reaching the semiconductor layer 119 is provided in the insulating layers 129 and 131 so that part of the end portions of the insulating layers 129 and 131 covers the end portion of the semiconductor layer 119. The insulating layer 133 is provided to cover the semiconductor layer 119, the insulating layer 131, and the opening 140. The pixel electrode 121 is provided over the insulating layer 133. The alignment film 135 is provided over the insulating layer 133 and the pixel electrode 121.

The cross-sectional structure of the display device illustrated in FIG. 4 is described below.

The insulating layer 127 is provided over the substrate 102. The semiconductor layer 119 is provided over the insulating layer 127. The capacitor line 115 is provided over the semiconductor layer 119. The insulating layer 133 is provided over the capacitor line 115 and the semiconductor layer 119. The pixel electrode 121 and a pixel electrode 121d are provided over the insulating layer 133. The alignment film 135 is provided over the insulating layer 133 and the pixel electrodes 121 and 121d.

Note that the pixel electrode 121d serves as a pixel electrode of the pixel adjacent to the pixel 101 (the pixel on the left side of the pixel 101 in FIG. 1). As illustrated in FIG. 4, the semiconductor layer 119 can be shared by the pixel 101 and the adjacent pixel. In other words, the semiconductor layer 119 is at least partly continuous to the adjacent pixel. Note that the pixel 101 and the adjacent pixel share the semiconductor layer 119 and the opening 140 but separately include the pixel electrode 121 and the pixel electrode 121d; thus, in the pixel adjacent to the pixel 101, the semiconductor layer 119, the insulating layer 133, and the pixel electrode 121d form a capacitor 105d.

In the display device illustrated in FIGS. 2 to 4, a substrate 152 is placed to face the substrate 102. A liquid crystal layer 164 is provided between the substrate 102 and the substrate 152. Further, a light-blocking layer 154, a coloring layer 156, an insulating layer 158, a conductive layer 160, and an alignment film 162 are provided under the substrate 152. Note that a region in which the coloring layer 156 is formed corresponds to an aperture of the pixel 101 and serves as a display region.

In the display device illustrated in FIGS. 2 to 4, a liquid crystal element 170 includes the pixel electrode 121, the alignment film 135, the liquid crystal layer 164, the alignment film 162, and the conductive layer 160. In other words, the liquid crystal layer 164 is provided between the pixel electrode 121 and the conductive layer 160. Note that the conductive layer 160 serves as a counter electrode of the liquid crystal element 170. The liquid crystal element 170 controls whether to transmit light or not by an optical modulation action of the liquid crystal layer 164 due to voltage application between the pixel electrode 121 and the conductive layer 160. Note that the alignment films 135 and 162 are not necessarily provided depending on a material used for the liquid crystal layer 164.

In the display device illustrated in FIGS. 2 to 4, the capacitor 105 includes the semiconductor layer 119, the insulating layer 133, and the pixel electrode 121. The semiconductor layer 119 serves as one electrode of the capacitor 105 and can also be used as one electrode of an adjacent capacitor. Further, the pixel electrode 121 serves as the other electrode of the capacitor 105 and is apart from the other electrode of the adjacent capacitor.

In the display device, as illustrated in FIGS. 2 and 3, the pixel electrode 121 is formed over the insulating layer 133 so as to cover the shape of the insulating layers 129 and 131 provided with the opening 140, and therefore the pixel electrode 121 has the depressed portion.

In the display device, as illustrated in FIGS. 2 and 3, the spacer 166 is provided in contact with the conductive layer 160. The spacer 166 is provided to control the thickness (cell gap) of the liquid crystal layer 164 and has a function of controlling alignment in the liquid crystal layer 164.

Here, a method for controlling alignment in the liquid crystal layer 164 is described with reference to FIG. 3.

Arrows illustrated in FIG. 3 schematically show the influence of a step difference on alignment in the liquid crystal layer 164. Specifically, the liquid crystal layer 164 is affected by a step difference due to the spacer 166 and a step difference due to the depressed portion of the pixel electrode 121.

In this manner, in the display device of one embodiment of the present invention, alignment in the liquid crystal layer 164 can be controlled by utilizing the step difference due to the spacer 166 and the step difference due to the depressed portion of the pixel electrode 121 without additionally providing a protrusion such as a rib. The spacer 166 and the depressed portion of the pixel electrode 121 are formed in each pixel of the display device independently, and therefore, alignment in the liquid crystal layer 164 of each pixel is independently controlled without rubbing treatment. Thus, an excellent display device having less defective alignment can be provided.

A planarization film to reduce the influence of a step difference is not used in the pixel 101 of the display device described in this embodiment. Thus, even in the case where an oxide semiconductor layer is used as the semiconductor layer of the transistor, for example, impurities (e.g., water contained in an organic resin) that can enter the oxide semiconductor layer are reduced; therefore, a highly reliable display device can be provided. Accordingly, with the display device of one embodiment of the present invention, defective alignment can be reduced and a highly reliable transistor can be used, leading to a display device having high display quality.

Note that other components of the display device of one embodiment of the present invention illustrated in FIGS. 1 to 4 are described in detail in the next description of a method for manufacturing the display device.

<Method for Manufacturing Display Device>

A method for manufacturing the display device illustrated in FIGS. 1 to 4 is described below with reference to FIGS. 5A to 5C, FIGS. 6A and 6B, and FIGS. 7A and 7B. Note that in FIGS. 5A to 7B, the cross-sectional structure of the display device illustrated in FIG. 2 is described as an example.

First, the substrate 102 is prepared. For the substrate 102, a glass material such as aluminosilicate glass, aluminoborosilicate glass, or barium borosilicate glass is used. In the mass production, for the substrate 102, a mother glass with any of the following sizes is preferably used: the 8th generation (2160 mm×2460 mm), the 9th generation (2400 mm×2800 mm, or 2450 mm×3050 mm), the 10th generation (2950 mm×3400 mm), and the like. A high process temperature and a long period of process time drastically shrink the mother glass. Thus, in the case where mass production is performed with the use of the mother glass, it is preferable that the heat process in the manufacturing process be performed at a temperature lower than or equal to 600° C., further preferably lower than or equal to 450° C., still further preferably lower than or equal to 350° C.

Next, a conductive layer is formed over the substrate 102, and the conductive layer is processed so that a desired region remains. Thus, the scan line 107 is formed. After that, the insulating layer 127 is formed over the substrate 102 and the scan line 107. Then, a semiconductor layer is formed over the insulating layer 127, and the semiconductor layer is processed so that a desired region remains. Thus, the semiconductor layers 111 and 119 are formed (see FIG. 5A).

The scan line 107 can be formed using a metal element selected from aluminum, chromium, copper, tantalum, titanium, molybdenum, and tungsten, an alloy containing any of these metal elements as a component, an alloy containing these metal elements in combination, or the like. Further, the scan line 107 may have a single-layer structure or a stacked-layer structure of two or more layers. For example, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. Alternatively, a film, an alloy film, or a nitride film that contains aluminum and one or more elements selected from titanium, tantalum, tungsten, molybdenum, chromium, neodymium, and scandium may be used. Further, the scan line 107 can be formed by a sputtering method, for example.

The insulating layer 127 is formed with a single-layer structure or a stacked-layer structure using, for example, any of a silicon nitride oxide film, a silicon nitride film, an aluminum oxide film, and the like with a PE-CVD apparatus. In the case where the insulating layer 127 has a stacked-layer structure, it is preferable that a silicon nitride film with fewer defects be provided as a first silicon nitride film, and a silicon nitride film from which hydrogen and ammonia are less likely to be released be provided as a second silicon nitride film over the first silicon nitride film. As a result, hydrogen and nitrogen contained in the insulating layer 127 can be prevented from moving or diffusing into the semiconductor layers 111 and 119.

The insulating layer 127 is formed to have a single-layer structure or a stacked-layer structure using any of a silicon oxide film, a silicon oxynitride film, and the like with a PE-CVD apparatus.

The insulating layer 127 can have a stacked-layer structure, for example, in which a 400-nm-thick silicon nitride film and a 50-nm-thick silicon oxynitride film are formed in this order. The silicon nitride film and the silicon oxynitride film are preferably formed in succession in a vacuum so that fewer impurities are mixed into the films. Note that a portion of the insulating layer 127 that overlaps with the scan line 107 serves as the gate insulating layer of the transistor 103. Note that silicon nitride oxide refers to an insulating material that contains more nitrogen than oxygen, whereas silicon oxynitride refers to an insulating material that contains more oxygen than nitrogen.

The insulating layer 127 serves as the gate insulating layer of the transistor 103. When the gate insulating layer has the above structure, the following effects can be obtained, for example. The silicon nitride film has a higher dielectric constant than a silicon oxide film and needs a larger thickness for an equivalent capacitance. Thus, the physical thickness of the gate insulating film can be increased. This makes it possible to reduce a decrease in withstand voltage of the transistor 103 and furthermore increase the withstand voltage, thereby reducing electrostatic discharge damage to the transistor 103.

The semiconductor layers 111 and 119 are preferably formed using an oxide semiconductor film. The oxide semiconductor film preferably includes a film represented by an In-M-Zn oxide that contains at least indium (In), zinc (Zn), and M (M represents an element such as Al, Ga, Ge, Y, Zr, Sn, La, Ce, or Hf). Alternatively, both In and Zn are preferably contained. In order to reduce a variation in electrical characteristics among the transistors each including the oxide semiconductor, the oxide semiconductor preferably contains a stabilizer in addition to In and/or Zn.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor included in the semiconductor layers 111 and 119, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that the In—Ga—Zn-based oxide refers to an oxide containing In, Ga, and Zn as its main components and there is no particular limitation on the ratio of In to Ga and Zn. The In—Ga—Zn-based oxide may contain a metal element other than the In, Ga, and Zn.

The semiconductor layers 111 and 119 can be formed by a sputtering method, a molecular beam epitaxy (MBE) method, a CVD method, a pulsed laser deposition method, an atomic layer deposition (ALD) method, or the like as appropriate.

In the formation of an oxide semiconductor film for the semiconductor layers 111 and 119, the hydrogen concentration in the oxide semiconductor film is preferably reduced as much as possible. To reduce the hydrogen concentration, for example, in the case of a sputtering method, a deposition chamber needs to be evacuated to a high vacuum and also a sputtering gas needs to be highly purified. As an oxygen gas or an argon gas used for a sputtering gas, a gas which is highly purified to have a dew point of −40° C. or lower, preferably −80° C. or lower, further preferably −100° C. or lower, or still further preferably −120° C. or lower is used, whereby entry of moisture or the like into the oxide semiconductor film can be minimized.

In order to remove moisture remaining in the deposition chamber, an entrapment vacuum pump such as a cryopump, an ion pump, or a titanium sublimation pump is preferably used. A turbo molecular pump provided with a cold trap may be alternatively used. When the deposition chamber is evacuated with a cryopump, which has a high capability in removing a hydrogen molecule, a compound including a hydrogen atom such as water ($H_2O$), a compound including a carbon atom, and the like, the concentration of an impurity to be contained in a film formed in the deposition chamber can be reduced.

When the oxide semiconductor film for the semiconductor layers 111 and 119 is formed by a sputtering method, the relative density (filling factor) of a metal oxide target that is used for the film formation is greater than or equal to 90% and less than or equal to 100%, preferably greater than or equal to 95% and less than or equal to 100%. With the use of the metal oxide target having high relative density, a dense oxide semiconductor film can be formed.

Note that to reduce the impurity concentration of the oxide semiconductor film, it is also effective to form the oxide semiconductor film while the substrate 102 is kept at high temperature. The temperature at which the substrate 102 is heated may be higher than or equal to 150° C. and lower than or equal to 450° C.; the substrate temperature is preferably higher than or equal to 200° C. and lower than or equal to 350° C.

Next, first heat treatment is preferably performed. The first heat treatment may be performed at a temperature higher than or equal to 250° C. and lower than or equal to 650° C., preferably higher than or equal to 300° C. and lower than or equal to 500° C., in an inert gas atmosphere, an atmosphere containing an oxidizing gas at 10 ppm or more, or a reduced pressure state. Alternatively, the first heat treatment may be performed in such a manner that heat treatment is performed in an inert gas atmosphere, and then another heat treatment is performed in an atmosphere containing an oxidizing gas at 10 ppm or more, in order to compensate for desorbed oxygen. By the first heat treatment, the crystallinity of the oxide semiconductor that is used for the semiconductor layers 111 and 119 can be improved, and in addition, impurities such as hydrogen and water can be removed from the insulating layer 127 and the semiconductor layers 111 and 119. The first heat treatment may be performed before processing into the semiconductor layers 111 and 119 having an island shape.

Next, a conductive film is formed over the insulating layer 127 and the semiconductor layers 111 and 119, and the conductive film is processed so that a desired region remains. Thus, the data line 109 and the conductive layer 113 are formed. At this stage, the transistor 103 is formed (see FIG. 5B).

Although not illustrated in FIGS. 5A to 7B, the capacitor line 115 in FIGS. 1 and 4 can be formed at the same time as the data line 109 and the conductive layer 113.

The data line 109 and the conductive layer 113 can be formed using the conductive film having a single-layer structure or a stacked-layer structure with any of metals such as aluminum, titanium, chromium, nickel, copper, yttrium, zirconium, molybdenum, silver, tantalum, and tungsten, or an alloy containing any of these metals as its main component. For example, a two-layer structure in which a titanium film is stacked over an aluminum film, a two-layer structure in which a titanium film is stacked over a tungsten film, a two-layer structure in which a copper film is formed over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. The conductive film can be formed by a sputtering method, for example.

Figure 5A:
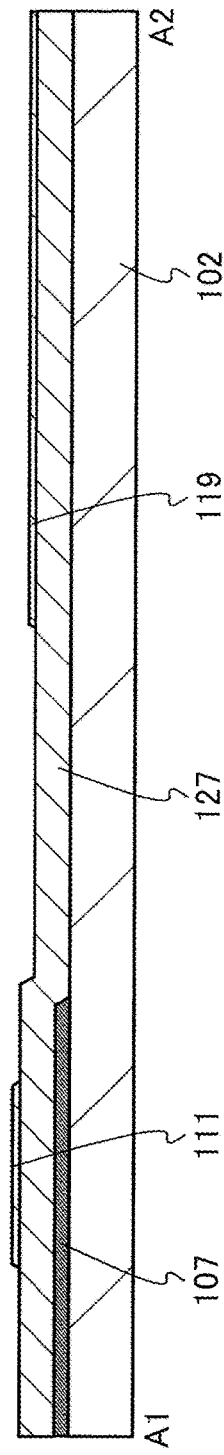
FIGS. 5A to 5C are cross-sectional views illustrating a method for manufacturing a display device of one embodiment of the present invention.
Figure 5B:
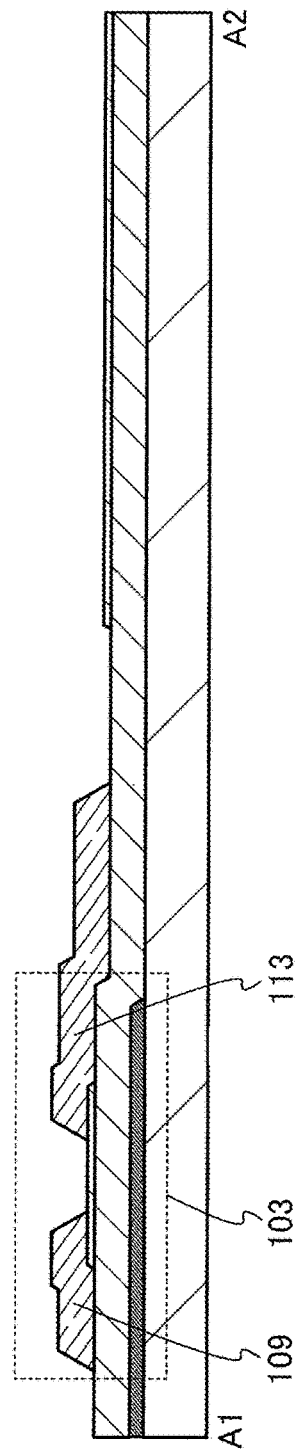
Figure 5C:
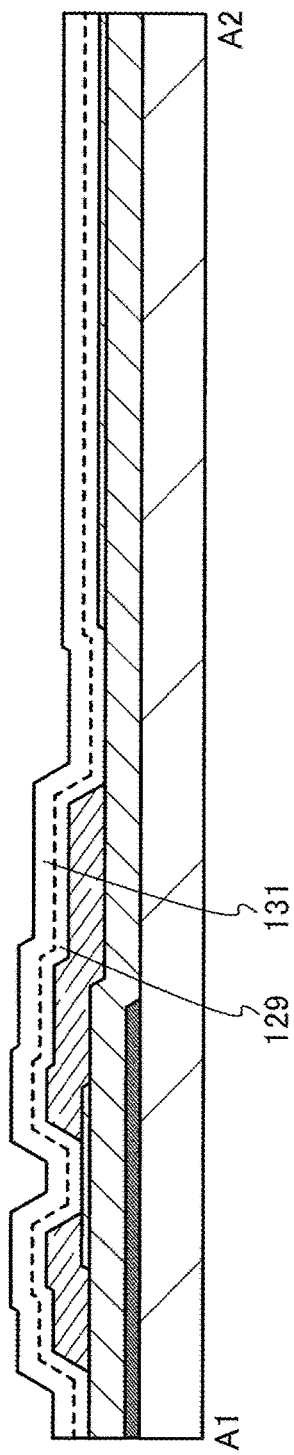

Next, the insulating layers 129 and 131 are formed over the insulating layer 127, the semiconductor layers 111 and 119, the data line 109, and the conductive layer 113 (see FIG. 5C).

For the insulating layers 129 and 131, an inorganic insulating material containing oxygen can be used in order to improve the characteristics of the interface with the oxide semiconductor used for the semiconductor layer 111. The insulating layers 129 and 131 can be formed by a PE-CVD method, for example.

The thickness of the insulating layer 129 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating layer 131 can be greater than or equal to 30 nm and less than or equal to 500 nm, preferably greater than or equal to 150 nm and less than or equal to 400 nm.

Further, the insulating layers 129 and 131 can be formed using insulating films formed of the same kinds of materials; thus, a boundary between the insulating layer 129 and the insulating layer 131 cannot be clearly observed in some cases. Thus, in this embodiment, the boundary between the insulating layer 129 and the insulating layer 131 is shown by a dashed line. Although a two-layer structure of the insulating layers 129 and 131 is described in this embodiment, the present invention is not limited to this. For example, a single-layer structure of the insulating layer 129, a single-layer structure of the insulating layer 131, or a stacked-layer structure including three or more layers may be used.

Next, the insulating layers 129 and 131 are processed so that a desired region remains. Thus, the opening 140 is formed (see FIG. 6A).

Note that the opening 140 is formed to expose at least the semiconductor layer 119. In this embodiment, the semiconductor layer 119 is exposed in the opening 140. The opening 140 can be formed by a dry etching method, for example. Note that the method for forming the opening 140 is not limited to the dry etching method, and a wet etching method or a combination of dry etching and wet etching may be employed.

For example, in the case where a dry etching method is used as a method for forming the opening 140 and an oxide semiconductor film is used for the semiconductor layer 119, oxygen vacancies may be formed in the oxide semiconductor film.

Note that elements which form oxygen vacancies in the oxide semiconductor film are described as impurity elements. Typical examples of impurity elements are hydrogen, boron, carbon, nitrogen, fluorine, aluminum, silicon, phosphorus, chlorine, and rare gas elements. Typical examples of rare gas elements are helium, neon, argon, krypton, and xenon.

Next, the insulating layer 133 is formed so as to cover the insulating layer 131, the semiconductor layer 119, and the opening 140. The insulating layer 133 includes a depressed portion along the opening 140 (see FIG. 6B).

The insulating layer 133 is a film formed using a material that can prevent an external impurity, such as water, alkali metal, or alkaline earth metal, from diffusing into the oxide semiconductor layer, and that further contains hydrogen. Thus, when hydrogen in the insulating layer 133 is diffused to the semiconductor layer 119, hydrogen is bonded to oxygen or to oxygen vacancies to generate electrons that are carriers in the semiconductor layer 119. As a result, the conductivity of the semiconductor layer 119 is increased, so that the semiconductor layer 119 becomes a conductive layer having a light-transmitting property. Note that in drawings in this embodiment, the semiconductor layer 119 before the conductivity is increased and the semiconductor layer 119 after the conductivity is increased are indicated by different hatching patterns.

Here, an oxide semiconductor film with high conductivity which is used as the semiconductor layer 119 is described below.

<Oxide Semiconductor Film with High Conductivity>

When hydrogen is added to an oxide semiconductor including oxygen vacancies, hydrogen enters oxygen vacant sites and forms a donor level in the vicinity of the conduction band. As a result, the conductivity of the oxide semiconductor is increased, so that the oxide semiconductor becomes a conductor. An oxide semiconductor having become a conductor can be referred to as an oxide conductor. Oxide semiconductors generally have a visible light transmitting property because of their large energy gap. An oxide conductor is an oxide semiconductor having a donor level in the vicinity of the conduction band. Therefore, the influence of absorption due to the donor level is small, and an oxide conductor has a visible light transmitting property comparable to that of an oxide semiconductor.

Figure 24:
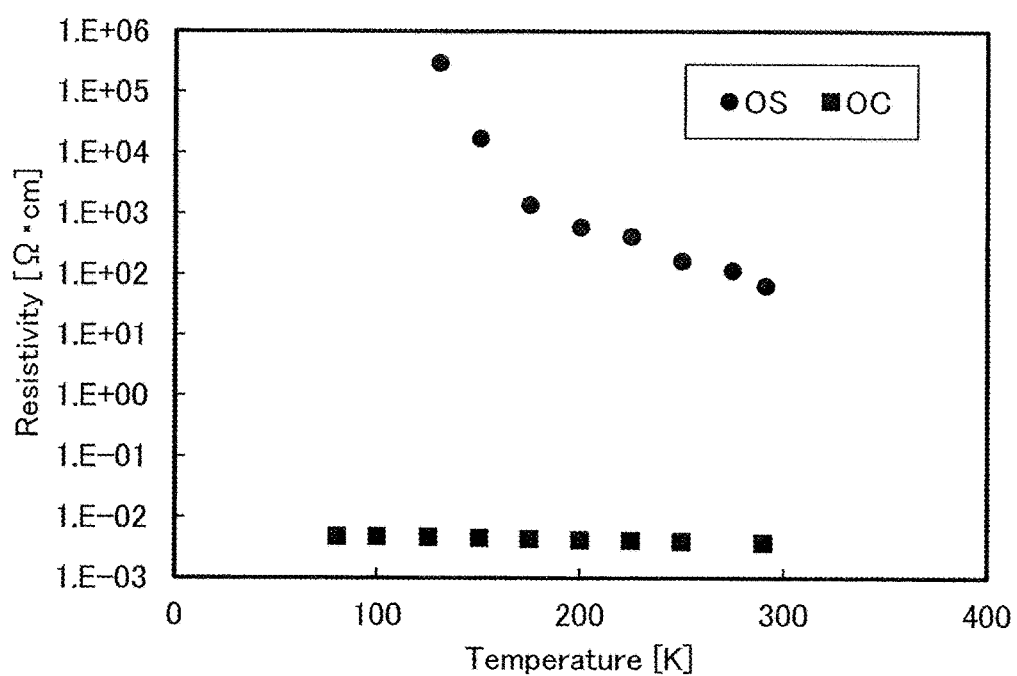
FIG. 24 shows temperature dependence of resistivity.

Here, the temperature dependence of resistivity of a film formed with an oxide semiconductor (hereinafter referred to as an oxide semiconductor film (OS)) and that of a film formed with an oxide conductor (hereinafter referred to as an oxide conductor film (OC)) will be described with reference to FIG. 24. In FIG. 24, the horizontal axis represents measurement temperature, and the vertical axis represents resistivity. Measurement results of the oxide semiconductor film (OS) are plotted as circles, and measurement results of the oxide conductor film (OC) are plotted as squares.

Note that a sample including the oxide semiconductor film (OS) was prepared by forming a 35-nm-thick In—Ga—Zn oxide film over a glass substrate by a sputtering method using a sputtering target with an atomic ratio of In:Ga:Zn=1:1:1.2, forming a 20-nm-thick In—Ga—Zn oxide film over the 35-nm-thick In—Ga—Zn oxide film by a sputtering method using a sputtering target with an atomic ratio of In:Ga:Zn=1:4:5, performing heat treatment in a 450° C. nitrogen atmosphere and then performing heat treatment in a 450° C. atmosphere of a mixed gas of nitrogen and oxygen, and forming a silicon oxynitride film over the oxide films by a plasma CVD method.

A sample including the oxide conductor film (OC) was prepared by forming a 100-nm-thick In—Ga—Zn oxide film over a glass substrate by a sputtering method using a sputtering target with an atomic ratio of In:Ga:Zn=1:1:1, performing heat treatment in a 450° C. nitrogen atmosphere and then performing heat treatment in a 450° C. atmosphere of a mixed gas of nitrogen and oxygen, and forming a silicon nitride film over the oxide film by a plasma CVD method.

As can be seen from FIG. 24, the temperature dependence of resistivity of the oxide conductor film (OC) is lower than the temperature dependence of resistivity of the oxide semiconductor film (OS). Typically, the range of variation of resistivity of the oxide conductor film (OC) at temperatures from 80 K to 290 K is from more than −20% to less than +20%. Alternatively, the range of variation of resistivity at temperatures from 150 K to 250 K is from more than −10% to less than +10%. In other words, the oxide conductor is a degenerate semiconductor and it is suggested that the conduction band edge agrees with or substantially agrees with the Fermi level. Therefore, the oxide conductor film can be used as one electrode of a capacitor.

In this embodiment, the method in which hydrogen is supplied from the insulating layer 133 formed in contact with the semiconductor layer 119 is described, but the present invention is not limited to this. For example, a mask is formed over the semiconductor layer 111 to serve as a channel of the transistor 103, and a region not covered with the mask can be supplied with hydrogen. For example, an ion doping apparatus or the like can be used to introduce hydrogen into the semiconductor layer 119.

For example, a silicon nitride film, a silicon nitride oxide film, or the like having a thickness of greater than or equal to 150 nm and less than or equal to 400 nm can be used as the insulating layer 133. In this embodiment, a 150-nm-thick silicon nitride film is used as the insulating layer 133.

The silicon nitride film is preferably formed at a high temperature to have an improved blocking property; for example, the silicon nitride film is preferably formed at a temperature in the range from the substrate temperature of 100° C. to the strain point of the substrate, more preferably at a temperature in the range from 300° C. to 400° C. When the silicon nitride film is formed at a high temperature, a phenomenon in which oxygen is released from the oxide semiconductor used for the semiconductor layer 111 and the carrier concentration is increased is caused in some cases; therefore, the upper limit of the temperature is a temperature at which the phenomenon is not caused.

Next, the insulating layers 129, 131, and 133 are processed so that a desired region remains. Thus, the opening 117 is formed (see FIG. 7A).

The opening 117 is formed to expose the conductive layer 113. Note that the opening 117 can be formed by a dry etching method, for example. Note that the method for forming the opening 117 is not limited to this, and a wet etching method or a combination of dry etching and wet etching can be employed.

Next, a conductive layer is formed over the insulating layer 133 to cover the opening 117, and the conductive layer is processed so that a desired region remains. Thus, the pixel electrode 121 is formed. At this stage, the capacitor 105 is formed. Note that the pixel electrode 121 is formed over the insulating layer 133 along the depressed portion in the insulating layers 129 and 131 which is formed by the opening 140. Therefore, the pixel electrode 121 has the depressed portion (see FIG. 7B).

The pixel electrode 121 can be formed using the conductive layer with a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added. Further, the conductive layer that can be used for the pixel electrode 121 can be formed by a sputtering method, for example.

The one electrode of the capacitor 105 is the semiconductor layer 119 formed over the same surface as the semiconductor layer 111 used for the transistor 103, and the semiconductor layer 119 is a light-transmitting semiconductor film. Further, the dielectric film of the capacitor 105 is the insulating layer 133 having a light-transmitting property which is provided over the semiconductor layer 111 of the transistor 103. Further, the other electrode of the capacitor 105 is the pixel electrode 121 having a light-transmitting property which is electrically connected to the transistor 103. Thus, the capacitor 105 can be formed over the same surface, i.e., in the same steps, as the transistor 103.

Thus, the capacitor 105 has a light-transmitting property and thus can be formed large (in a large area) in a region of the pixel 101 where the transistor 103 is not formed. Accordingly, one embodiment of the present invention can provide a display device whose aperture ratio and capacitance are increased. Further, the display device can have an excellent display quality owing to the increase in aperture ratio.

Through the above steps, the transistor 103 and the capacitor 105 can be formed over the substrate 102.

Next, a structure formed over the substrate 152 facing the substrate 102 is described below.

First, the substrate 152 is prepared. For materials of the substrate 152, the materials that can be used for the substrate 102 can be referred to. Next, the light-blocking layer 154, the coloring layer 156, and the insulating layer 158 are formed over the substrate 152 (see FIG. 8A).

The light-blocking layer 154 preferably has a function of blocking light in a particular wavelength region, and can be a metal film or an organic insulating film including a black pigment. The coloring layer 156 is a coloring layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. The light-blocking layer 154 and the coloring layer 156 each are formed in a desired position with any of various materials by a printing method, an inkjet method, an etching method using a photolithography technique, or the like.

For the insulating layer 158, for example, an organic insulating film of an acrylic-based resin or the like can be used. With the insulating layer 158, impurities or the like contained in the coloring layer 156 can be prevented from diffusing into the liquid crystal layer 164 side, for example. Note that the insulating layer 158 is not necessarily formed.

Next, the conductive layer 160 is formed over the insulating layer 158. Then, the spacer 166 is formed in a desired region over the conductive layer 160 (see FIG. 8B).

For materials of the conductive layer 160, materials that can be used for the pixel electrode 121 can be referred to.

The spacer 166 is a columnar spacer obtained by selective etching of an insulating layer and is provided in order to control the thickness (cell gap) of the liquid crystal layer 164. For example, the spacer 166 is preferably a columnar spacer in the shape of a circle, an ellipse, a triangle, a quadrangle, or a polygon with more than four corners. The spacer 166 can be formed using, for example, an organic material such as an acrylic-based resin or a polyimide-based resin, or an inorganic material such as a silicon oxide film, a silicon oxynitride film, a silicon nitride film, a silicon nitride oxide film, an aluminum oxide film, or an aluminum nitride film. The thickness (also referred to as height) of the spacer 166 is more than or equal to 0.5 μm and less than or equal to 10 μm, preferably more than or equal to 1.0 μm and less than or equal to 4 μm.

Figure 8A:
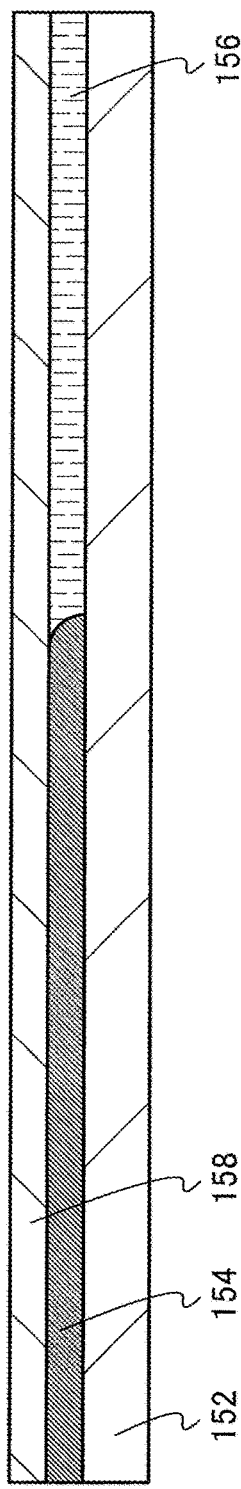
FIGS. 8A and 8B are cross-sectional views illustrating a method for manufacturing a display device of one embodiment of the present invention.
Figure 8B:
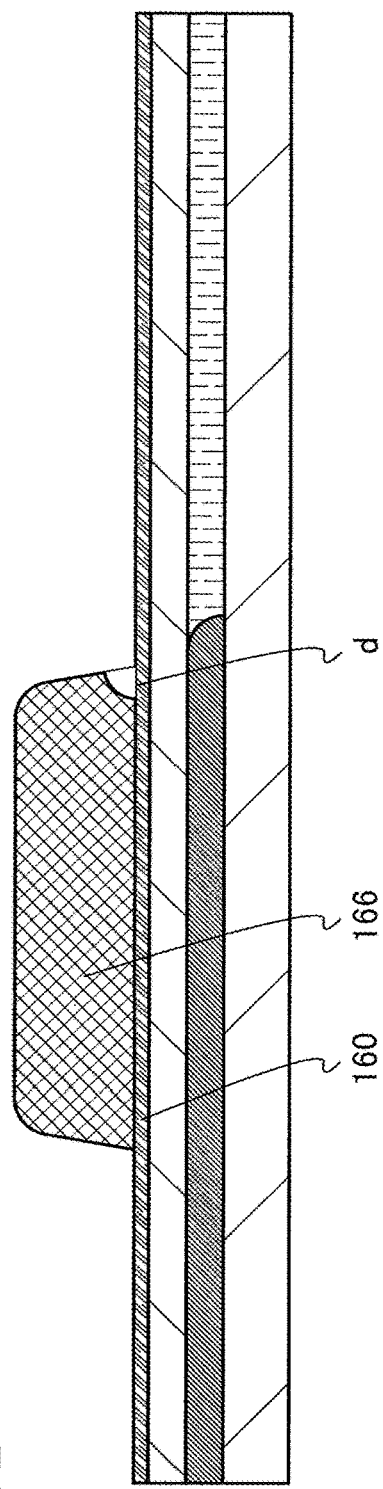

In one embodiment of the present invention, in order to control alignment in the liquid crystal layer 164 with the spacer 166, the spacer 166 preferably has a taper angle d greater than or equal to 45° and less than 90°, more preferably greater than or equal to 60° and less than or equal to 85° in the cross-sectional view illustrated in FIG. 8B. In the case where the spacer 166 has a plurality of taper angles d, it is acceptable as long as at least one of the taper angles d falls within the above-described range.

Through the above steps, the structure formed over the substrate 152 can be formed.

Next, the alignment film 135 is formed over the insulating layer 133 and the pixel electrode 121 which are formed over the substrate 102. Further, the alignment film 162 is formed in contact with the conductive layer 160 and the spacer 166 which are formed over the substrate 152. The alignment films 135 and 162 can be formed by a coating method or the like. After that, the liquid crystal layer 164 is formed between the substrate 102 and the substrate 152. The liquid crystal layer 164 can be formed by a dispenser method (a dropping method), or an injecting method by which a liquid crystal is injected using a capillary phenomenon after the substrate 102 and the substrate 152 are bonded to each other.

Through the above process, the display device illustrated in FIG. 2 can be manufactured.

<Modification Example>

Here, modification examples of the top view of the pixel and its periphery of the display device illustrated in FIG. 1 will be described with reference to FIGS. 9 to 11. Note that in top views illustrated in FIGS. 9 to 11, some components are not illustrated in order to avoid complexity of the drawings.

Figure 9:
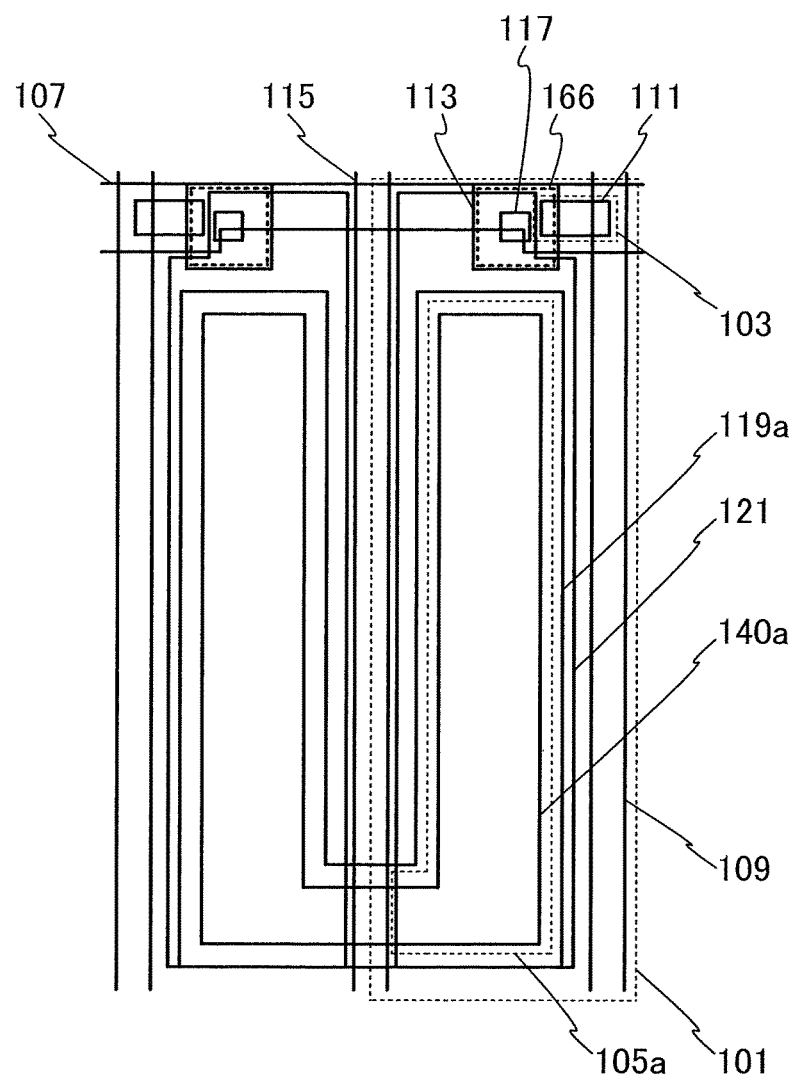
FIG. 9 is a top view illustrating a pixel and its periphery of a display device of one embodiment of the present invention.
Figure 10:
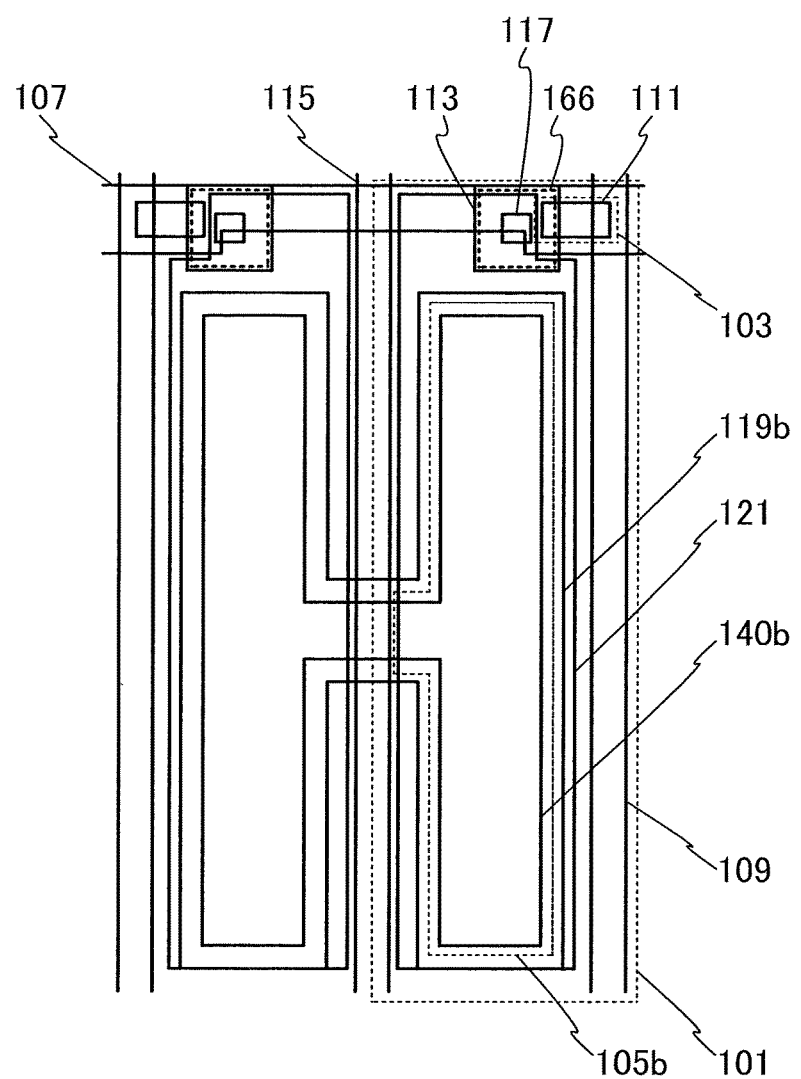
FIG. 10 is a top view illustrating a pixel and its periphery of a display device of one embodiment of the present invention.
Figure 11:
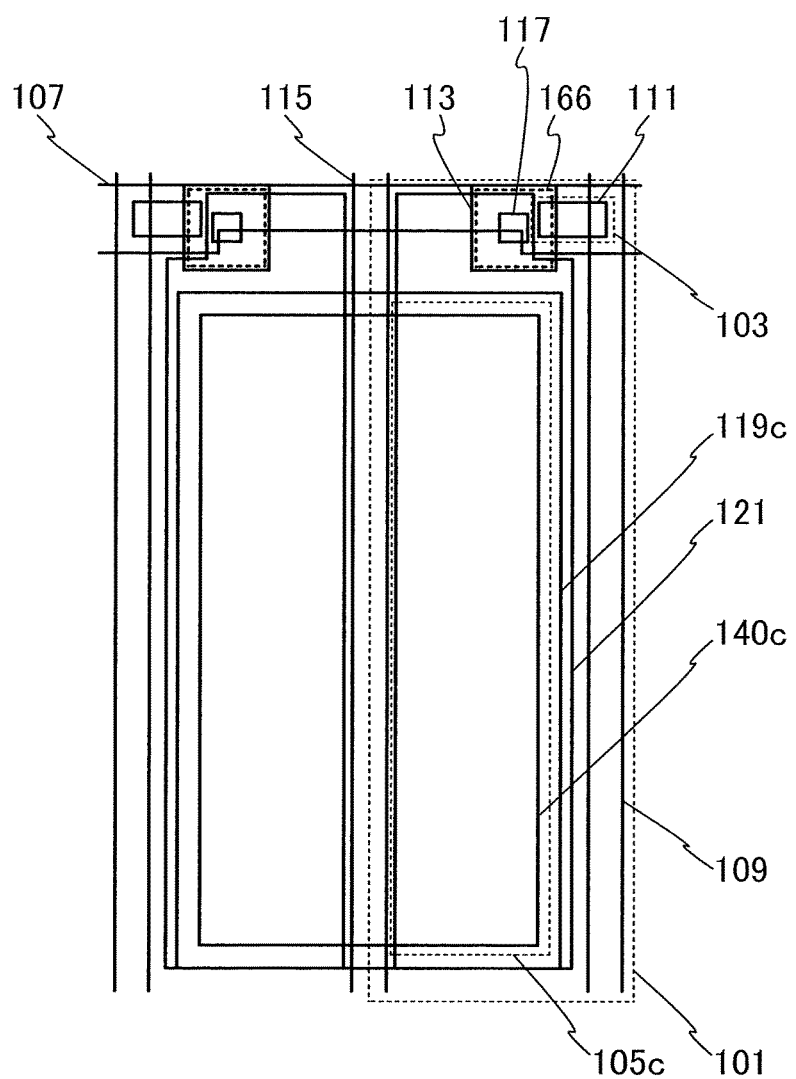
FIG. 11 is a top view illustrating a pixel and its periphery of a display device of one embodiment of the present invention.

In the top views of the pixel and its periphery illustrated in FIGS. 9 to 11, portions that are similar to or have functions similar to those of the portions of the display device illustrated in FIG. 1 are denoted by the same reference numerals, and detailed description thereof is omitted.

A top view of a pixel and its periphery of a display device illustrated in FIG. 9 differs from the top view illustrated in FIG. 1 in the shapes of a capacitor, an opening, and a semiconductor layer. Specifically, the display device illustrated in FIG. 9 includes a capacitor 105a. The capacitor 105a includes a semiconductor layer 119a having higher conductivity than that of the semiconductor layer 111 included in the transistor 103 and a light-transmitting property, the pixel electrode 121 having a light-transmitting property, and an insulating layer having a light-transmitting property (not illustrated in FIG. 9) which is included in the transistor 103, as a dielectric layer. That is, the capacitor 105a transmits light. An opening 140a is formed over the semiconductor layer 119a. The opening 140a is formed by processing an insulating layer (not illustrated in FIG. 9) provided over the semiconductor layer 119a. The pixel electrode 121 is formed so as to cover part of the opening 140a and therefore has a depressed portion.

FIG. 9 illustrates two pixels as an example, in which the pixel 101 and the adjacent pixel (the pixel on the left side of the pixel 101 in FIG. 9) share the capacitor line 115. The capacitor 105a in the pixel 101 and that in the adjacent pixel are located symmetrically with respect to the capacitor line 115. Note that a difference of the top view illustrated in FIG. 9 from the top view illustrated in FIG. 1 is that connecting regions of the semiconductor layer 119a and the opening 140a between the pixel 101 and the adjacent pixel are located in a lower portion of the pixel 101.

A top view of a pixel and its periphery of a display device illustrated in FIG. 10 differs from the top view illustrated in FIG. 1 in the shapes of a capacitor, an opening, and a semiconductor layer. Specifically, the display device illustrated in FIG. 10 includes a capacitor 105b. The capacitor 105b includes a semiconductor layer 119b having higher conductivity than that of the semiconductor layer 111 included in the transistor 103 and a light-transmitting property, the pixel electrode 121 having a light-transmitting property, and an insulating layer having a light-transmitting property (not illustrated in FIG. 10) which is included in the transistor 103, as a dielectric layer. That is, the capacitor 105b transmits light. An opening 140b is formed over the semiconductor layer 119b. The opening 140b is formed by processing an insulating layer (not illustrated in FIG. 10) provided over the semiconductor layer 119b. The pixel electrode 121 is formed so as to cover part of the opening 140b and therefore has a depressed portion.

FIG. 10 illustrates two pixels as an example, in which the pixel 101 and the adjacent pixel (the pixel on the left side of the pixel 101 in FIG. 10) share the capacitor line 115. The capacitor 105b in the pixel 101 and that in the adjacent pixel are located symmetrically with respect to the capacitor line 115. Note that a difference of the top view illustrated in FIG. 10 from the top view illustrated in FIG. 1 is that connecting regions of the semiconductor layer 119b and the opening 140b between the pixel 101 and the adjacent pixel are located roughly in a middle portion of the pixel 101.

A top view of a pixel and its periphery of a display device illustrated in FIG. 11 differs from the top view illustrated in FIG. 1 in the shapes of a capacitor, an opening, and a semiconductor layer. Specifically, the display device illustrated in FIG. 11 includes a capacitor 105c. The capacitor 105c includes a semiconductor layer 119c having higher conductivity than that of the semiconductor layer 111 included in the transistor 103 and a light-transmitting property, the pixel electrode 121 having a light-transmitting property, and an insulating layer having a light-transmitting property (not illustrated in FIG. 11) which is included in the transistor 103, as a dielectric layer. That is, the capacitor 105c transmits light. An opening 140c is formed over the semiconductor layer 119c. The opening 140c is formed by processing an insulating layer (not illustrated in FIG. 11) provided over the semiconductor layer 119c. The pixel electrode 121 is formed so as to cover part of the opening 140c and therefore has a depressed portion.

FIG. 11 illustrates two pixels as an example, in which the pixel 101 and the adjacent pixel (the pixel on the left side of the pixel 101 in FIG. 11) share the capacitor line 115. The capacitor 105c in the pixel 101 and that in the adjacent pixel are located symmetrically with respect to the capacitor line 115. Note that a difference of the top view illustrated in FIG. 11 from the top view illustrated in FIG. 1 is that connecting regions of the semiconductor layer 119c and the opening 140c between the pixel 101 and the adjacent pixel are located continuously from upper to lower portions of the pixel 101 without gaps.

This embodiment can be combined with any of the other embodiments in this specification as appropriate.

(Embodiment 2)

In this embodiment, an example of an oxide semiconductor layer that can be used for the transistor and the capacitor of the display device described in Embodiment 1 is described.

<Crystallinity of Oxide Semiconductor Layer>

A structure of an oxide semiconductor layer is described below.

An oxide semiconductor layer is classified roughly into a non-single-crystal oxide semiconductor layer and a single crystal oxide semiconductor layer. The non-single-crystal oxide semiconductor layer includes any of a c-axis aligned crystalline oxide semiconductor (CAAC-OS) film, a polycrystalline oxide semiconductor layer, a microcrystalline oxide semiconductor layer, an amorphous oxide semiconductor layer, and the like.

First, a CAAC-OS film is described.

The CAAC-OS film is one of oxide semiconductor layers including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to a TEM image of the CAAC-OS film observed in a direction substantially parallel to a sample surface (cross-sectional TEM image), metal atoms are arranged in a layered manner in the crystal parts. Each metal atom layer has a morphology reflected by a surface where the CAAC-OS film is formed (hereinafter, a surface where the CAAC-OS film is formed is also referred to as a formation surface) or a top surface of the CAAC-OS film, and is arranged in parallel to the formation surface or the top surface of the CAAC-OS film.

Note that in this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly also includes the case where the angle is greater than or equal to 85° and less than or equal to 95°.

On the other hand, according to a TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single crystal oxide semiconductor layer of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface of the CAAC-OS film. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

The CAAC-OS film is an oxide semiconductor layer with a low impurity concentration. The impurity is an element other than the main components of the oxide semiconductor layer, such as hydrogen, carbon, silicon, or a transition metal element. In particular, an element that has higher bonding strength to oxygen than a metal element included in the oxide semiconductor layer, such as silicon, disturbs the atomic arrangement of the oxide semiconductor layer by depriving the oxide semiconductor layer of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor layer and causes a decrease in crystallinity when it is contained in the oxide semiconductor layer. Note that the impurity contained in the oxide semiconductor layer might serve as a carrier trap or a carrier generation source.

The CAAC-OS film is an oxide semiconductor layer having a low density of defect states.

With use of the CAAC-OS film in a transistor, a variation in the electrical characteristics of the transistor due to irradiation with visible light or ultraviolet light is small.

Next, a microcrystalline oxide semiconductor layer is described.

In an image obtained with the TEM, crystal parts cannot be found clearly in the microcrystalline oxide semiconductor layer in some cases. In most cases, the size of a crystal part in the microcrystalline oxide semiconductor layer is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm, is specifically referred to as nanocrystal (nc). An oxide semiconductor layer including nanocrystal is referred to as an nc-OS (nanocrystalline oxide semiconductor) film. In an image of the nc-OS film which is obtained with the TEM, for example, a boundary is not clearly detected in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. There is no regularity of crystal orientation between different crystal parts in the nc-OS film. Thus, the orientation of the whole film is not observed. Accordingly, in some cases, the nc-OS film cannot be distinguished from an amorphous oxide semiconductor layer depending on an analysis method. For example, when the nc-OS film is subjected to structural analysis by an out-of-plane method with an XRD apparatus using an X-ray having a diameter larger than the size of a crystal part, a peak which shows a crystal plane does not appear. Further, a diffraction pattern like a halo pattern appears in a selected-area electron diffraction pattern of the nc-OS film which is obtained by using an electron beam having a diameter (e.g., larger than or equal to 50 nm) larger than the size of a crystal part. Meanwhile, spots are observed in an electron diffraction pattern of the nc-OS film obtained by using an electron beam having a diameter (e.g., larger than or equal to 1 nm and smaller than or equal to 30 nm) close to or smaller than the size of a crystal part. Further, in a nanobeam electron diffraction pattern of the nc-OS film, for example, bright regions in a circular (or ring-shaped) pattern are shown in some cases. Also in a nanobeam electron diffraction pattern of the nc-OS film, a plurality of spots are shown in a ring-like region in some cases.

The nc-OS film is an oxide semiconductor layer that has high regularity as compared to an amorphous oxide semiconductor layer. Therefore, the nc-OS film has a lower density of defect states than an amorphous oxide semiconductor layer. Note that there is no regularity of crystal orientation between different crystal parts in the nc-OS film. Therefore, the nc-OS film has a higher density of defect states than the CAAC-OS film.

Note that an oxide semiconductor layer may be a stacked film including two or more kinds of an amorphous oxide semiconductor layer, a microcrystalline oxide semiconductor layer, and a CAAC-OS film, for example.

<Method for Forming CAAC-OS Film>

For example, a CAAC-OS film is deposited by a sputtering method using a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In that case, the flat-plate-like or pellet-like sputtered particle reaches a substrate while maintaining their crystal state, whereby the CAAC-OS film can be formed.

The flat-plate-like or pellet-like sputtered particle has, for example, an equivalent circle diameter of a plane parallel to the a-b plane of greater than or equal to 3 nm and less than or equal to 10 nm, and a thickness (length in the direction perpendicular to the a-b plane) of greater than or equal to 0.7 nm and less than 1 nm. Note that in the flat-plate-like or pellet-like sputtered particle, the plane parallel to the a-b plane may be a regular triangle or a regular hexagon. Here, the term "equivalent circle diameter of a plane" refers to the diameter of a perfect circle having the same area as the plane.

For the deposition of the CAAC-OS film, the following conditions are preferably used.

By increasing the substrate temperature during the deposition, migration of a sputtered particle is likely to occur after the sputtered particle reaches a substrate surface. Specifically, the substrate temperature during the deposition is higher than or equal to 100° C. and lower than or equal to 740° C., preferably higher than or equal to 200° C. and lower than or equal to 500° C. By increasing the substrate temperature during the deposition, when the flat-plate-like or pellet-like sputtered particle reaches the substrate, migration occurs on the substrate surface, so that a flat plane of the sputtered particle is attached to the substrate. At this time, the sputtered particles are positively charged, thereby being attached to the substrate while repelling each other; thus, the sputtered particles are not stacked unevenly, so that a CAAC-OS film with a uniform thickness can be deposited.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a deposition chamber may be reduced. Furthermore, the concentration of impurities in a deposition gas may be reduced. Specifically, a deposition gas whose dew point is −80° C. or lower, preferably −100° C. or lower is used.

Furthermore, preferably, the proportion of oxygen in the deposition gas is increased and the power is optimized in order to reduce plasma damage at the deposition. The proportion of oxygen in the deposition gas is 30 vol % or higher, preferably 100 vol %.

Alternatively, the CAAC-OS film is formed by the following method.

First, a first oxide semiconductor layer is formed to a thickness of greater than or equal to 1 nm and less than 10 nm. The first oxide semiconductor layer is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that the first oxide semiconductor layer becomes a first CAAC-OS film with high crystallinity. The temperature of the heat treatment is higher than or equal to 350° C. and lower than or equal to 740° C., preferably higher than or equal to 450° C. and lower than or equal to 650° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the first oxide semiconductor layer in a short time. At the same time, the heat treatment in an inert atmosphere may generate oxygen vacancies in the first oxide semiconductor layer. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the first oxide semiconductor layer in a shorter time.

The first oxide semiconductor layer with a thickness of greater than or equal to 1 nm and less than 10 nm can be easily crystallized by heat treatment as compared to the case where the first oxide semiconductor layer has a thickness of greater than or equal to 10 nm.

Next, a second oxide semiconductor layer having the same composition as the first oxide semiconductor layer is formed to a thickness of greater than or equal to 10 nm and less than or equal to 50 nm. The second oxide semiconductor layer is formed by a sputtering method. Specifically, the substrate temperature is set to higher than or equal to 100°

C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that solid phase growth of the second oxide semiconductor layer from the first CAAC-OS film occurs, whereby the second oxide semiconductor film is turned into a second CAAC-OS film having high crystallinity. The temperature of the heat treatment is higher than or equal to 350° C. and lower than or equal to 740° C., preferably higher than or equal to 450° C. and lower than or equal to 650° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the second oxide semiconductor layer in a short time. At the same time, the heat treatment in an inert atmosphere may generate oxygen vacancies in the second oxide semiconductor layer. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the second oxide semiconductor layer in a shorter time.

In the above-described manner, a CAAC-OS film having a total thickness of 10 nm or more can be formed. The CAAC-OS film can be favorably used as the oxide semiconductor layer in an oxide stack.

Next, a method for forming an oxide film in the case where a formation surface has a low temperature (e.g., a temperature lower than 130° C., lower than 100° C., or lower than 70° C., or about a room temperature (20° C. to 25° C.)) because, for example, the substrate is not heated is described.

In the case where the formation surface has a low temperature, sputtered particles fall irregularly to the formation surface. For example, migration does not occur; therefore, the sputtered particles are randomly deposited on the formation surface including a region where other sputtered particles have been deposited. That is, an oxide film obtained by the deposition might have a non-uniform thickness and a disordered crystal alignment. The oxide film obtained in the above manner maintains the crystallinity of the sputtered particles to a certain degree and thus has a crystal part (nanocrystal).

For example, in the case where the pressure at the deposition is high, the frequency with which the flying sputtered particle collides with another particle (e.g., an atom, a molecule, an ion, or a radical) of argon or the like is increased. When the flying sputtered particle collides with another particle (or is resputtered), the crystal structure of the sputtered particle might be broken. For example, when the sputtered particle collides with another particle, the flat-plate-like or pellet-like shape of the sputtered particle cannot be kept, and the sputtered particle might be broken into parts (e.g., atomized). At this time, when atoms obtained from the sputtered particle are deposited on the formation surface, an amorphous oxide semiconductor film might be formed.

In the case where not a sputtering method using a target including polycrystalline oxide but a deposition method using liquid or a method for depositing a film by vaporizing a solid such as a target is used, the atoms separately fly and are deposited to the formation surface; therefore, an amorphous oxide film might be formed. Further, for example, by a laser ablation method, atoms, molecules, ions, radials, clusters, or the like released from the target fly and are deposited to the formation surface; therefore, an amorphous oxide film might be formed.

An oxide semiconductor layer included in a resistor and a transistor in one embodiment of the present invention may have any of the above crystal states. Further, in the case of stacked oxide semiconductor layers, the crystal states of the oxide semiconductor layers may be different from each other. Note that a CAAC-OS film is preferably applied to the oxide semiconductor layer functioning as a channel of the transistor. Further, the oxide semiconductor layer included in the resistor has a higher impurity concentration than that of the oxide semiconductor layer included in the transistor; thus, the crystallinity is lowered in some cases.

The structures, methods, and the like described in this embodiment can be used as appropriate in combination with any of the structures, methods, and the like described in other embodiments.

(Embodiment 3)

In this embodiment, a display device in one embodiment of the present invention will be described with reference to FIGS. 12A and 12B. Note that portions that are similar to the portions in Embodiment 1 are denoted by the same reference numerals, and detailed description thereof is omitted.

The display device illustrated in FIG. 12A includes a region including display elements in pixels (hereinafter, the region is referred to as a pixel portion 302), a circuit portion being provided outside the pixel portion 302 and including a circuit for driving the pixels (hereinafter, the portion is referred to as a driver circuit portion 304), circuits each having a function of protecting an element (hereinafter, the circuits are referred to as protection circuits 306), and a terminal portion 307. Note that the protection circuits 306 are not necessarily provided.

A part or the whole of the driver circuit portion 304 is preferably formed over a substrate over which the pixel portion 302 is formed, in which case the number of components and the number of terminals can be reduced. When a part or the whole of the driver circuit portion 304 is not formed over the substrate over which the pixel portion 302 is formed, the part or the whole of the driver circuit portion 304 can be mounted by COG or TAB.

The pixel portion 302 includes a plurality of circuits for driving display elements arranged in a matrix of X rows (X is a natural number of 2 or more) and Y columns (Y is a natural number of 2 or more) (hereinafter, such circuits are referred to as pixels 101). The driver circuit portion 304 includes driver circuits such as a circuit for supplying a signal (scan signal) to select a pixel (hereinafter, the circuit is referred to as a gate driver 304*a*) and a circuit for supplying a signal (data signal) to drive a display element in a pixel (hereinafter, the circuit is referred to as a source driver 304*b*).

The gate driver 304*a* includes a shift register or the like. The gate driver 304*a* receives a signal for driving the shift register through the terminal portion 307 and outputs a signal. For example, the gate driver 304*a* receives a start pulse signal, a clock signal, or the like and outputs a pulse signal. The gate driver 304*a* has a function of controlling the potentials of wirings supplied with scan signals (hereinafter, such wirings are referred to as scan lines GL_1 to GL_X). Note that a plurality of gate drivers 304*a* may be provided to control the scan lines GL_1 to GL_X separately. Alternatively, the gate driver 304a has a function of supplying an initialization signal. Without being limited thereto, the gate driver 304a can supply another signal.

The source driver 304b includes a shift register or the like. The source driver 304b receives a signal (video signal) from which a data signal is derived, as well as a signal for driving the shift register, through the terminal portion 307. The source driver 304b has a function of generating a data signal to be written to the pixels 101 which is based on the video signal. In addition, the source driver 304b has a function of controlling output of a data signal in response to a pulse signal produced by input of a start pulse signal, a clock signal, or the like. Further, the source driver 304b has a function of controlling the potentials of wirings supplied with data signals (hereinafter, such wirings are referred to as data lines DL_1 to DL_Y). Alternatively, the source driver 304b has a function of supplying an initialization signal. Without being limited thereto, the source driver 304b can supply another signal.

The source driver 304b includes a plurality of analog switches or the like, for example. The source driver 304b can output, as the data signals, signals obtained by time-dividing the video signal by sequentially turning on the plurality of analog switches.

A pulse signal and a data signal are input to each of the plurality of pixels 101 through one of the plurality of scan lines GL supplied with scan signals and one of the plurality of data lines DL supplied with data signals, respectively. Writing and holding of the data signal to and in each of the plurality of pixels 101 are controlled by the gate driver 304a. For example, to the pixel 101 in the m-th row and the n-th column (m is a natural number of less than or equal to X, and n is a natural number of less than or equal to Y), a pulse signal is input from the gate driver 304a through the scan line GL_m, and a data signal is input from the source driver 304b through the data line DL_n in accordance with the potential of the scan line GL_m.

Figure 12A:
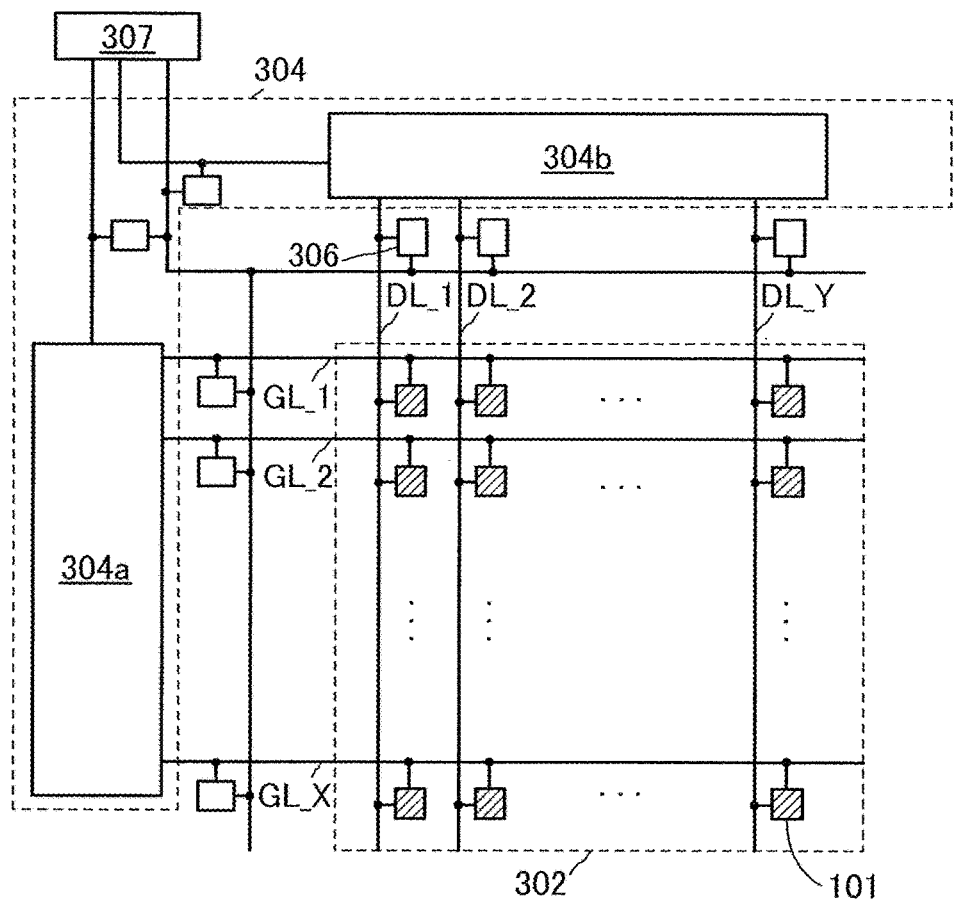
FIGS. 12A and 12B are a block diagram and a circuit diagram illustrating a display device.

The protection circuit 306 shown in FIG. 12A is connected to, for example, the scan line GL between the gate driver 304a and the pixel 101. Alternatively, the protection circuit 306 is connected to the data line DL between the source driver 304b and the pixel 101. Alternatively, the protection circuit 306 can be connected to a wiring between the gate driver 304a and the terminal portion 307. Alternatively, the protection circuit 306 can be connected to a wiring between the source driver 304b and the terminal portion 307. Note that the terminal portion 307 means a portion having terminals for inputting power, control signals, and video signals to the display device from external circuits.

The protection circuit 306 is a circuit that electrically connects a wiring connected to the protection circuit to another wiring when a potential out of a certain range is applied to the wiring connected to the protection circuit.

As illustrated in FIG. 12A, the protection circuits 306 are provided for the pixel portion 302 and the driver circuit portion 304, so that the resistance of the display device to overcurrent generated by electrostatic discharge (ESD) or the like can be improved. Note that the configuration of the protection circuits 306 is not limited to that, and for example, a configuration in which the protection circuits 306 are connected to the gate driver 304a but not to the source driver 304b or a configuration in which the protection circuits 306 are connected to the source driver 304b but not to the gate driver 304a may be employed. Alternatively, the protection circuits 306 may be configured to be connected to the terminal portion 307.

In FIG. 12A, an example in which the driver circuit portion 304 includes the gate driver 304a and the source driver 304b is shown; however, the structure is not limited thereto. For example, only the gate driver 304a may be formed and a separately prepared substrate where a source driver circuit is formed (e.g., a driver circuit substrate formed with a single crystal semiconductor film or a polycrystalline semiconductor film) may be mounted.

Figure 12B:
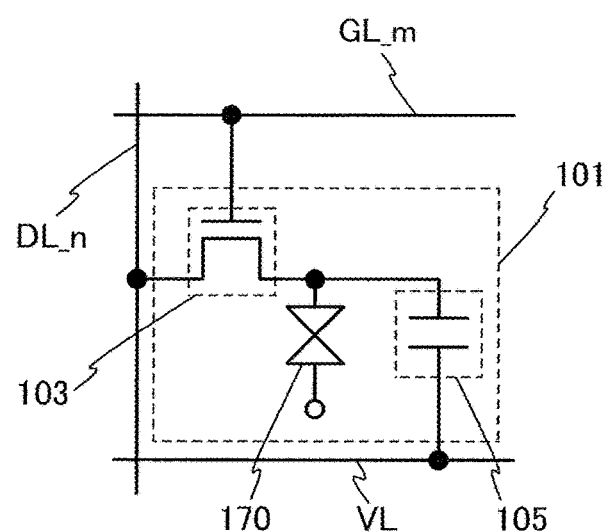

Each of the plurality of pixels 101 in FIG. 12A can have a structure illustrated in FIG. 12B, for example.

The pixel 101 illustrated in FIG. 12B includes the liquid crystal element 170, the transistor 103, and the capacitor 105. Note that the liquid crystal element 170, the transistor 103, and the capacitor 105 can be those in the display device in FIG. 1 described in Embodiment 1.

The potential of one of a pair of electrodes of the liquid crystal element 170 is set in accordance with the specifications of the pixel 101 as appropriate. The alignment state of the liquid crystal element 170 depends on written data. A common potential may be supplied to one of the pair of electrodes of the liquid crystal element 170 included in each of the plurality of pixels 101. Further, the potential supplied to one of the pair of electrodes of the liquid crystal element 170 in the pixel 101 in one row may be different from the potential supplied to one of the pair of electrodes of the liquid crystal element 170 in the pixel 101 in another row.

As an example of a driving method of the display device including the liquid crystal element 170, a vertical alignment (VA) mode is preferably used.

The liquid crystal element may be formed using a liquid crystal composition including liquid crystal exhibiting a blue phase and a chiral material. The liquid crystal exhibiting a blue phase has a short response time of 1 msec or less and is optically isotropic; therefore, alignment treatment is not necessary and viewing angle dependence is small.

In the pixel 101 in the m-th row and the n-th column, one of a source and a drain of the transistor 103 is electrically connected to the data line DL_n, and the other is electrically connected to the other of the pair of electrodes of the liquid crystal element 170. A gate of the transistor 103 is electrically connected to the scan line GL_m. The transistor 103 has a function of controlling whether to write a data signal by being turned on or off.

One of a pair of electrodes of the capacitor 105 is electrically connected to a wiring to which a potential is supplied (hereinafter referred to as a potential supply line VL), and the other is electrically connected to the other of the pair of electrodes of the liquid crystal element 170. The potential of the potential supply line VL is set in accordance with the specifications of the pixel 101 as appropriate. The capacitor 105 functions as a storage capacitor for storing written data.

For example, in the display device including the pixel 101 in FIG. 12A, the pixels 101 are sequentially selected row by row by the gate driver 304a, whereby the transistors 103 are turned on and a data signal is written.

When the transistors 103 are turned off, the pixels 101 in which the data has been written are brought into a holding state. This operation is sequentially performed row by row; thus, an image can be displayed.

The structure described in this embodiment can be used as appropriate in combination with any of the structures described in the other embodiments.

(Embodiment 4)

In this embodiment, structures of transistors that can be used in a display device of one embodiment of the present invention are described with reference to FIGS. 18A to 18C and FIGS. 19A to 19C. The transistors described in this embodiment can each be used as the transistor in the pixel 101 described in Embodiment 1 or the transistor in the driver circuit portion 304 described in Embodiment 3. Note that portions that are similar to the portions in the above embodiments are denoted by the same reference numerals, and detailed description thereof is omitted.

Figure 18A:
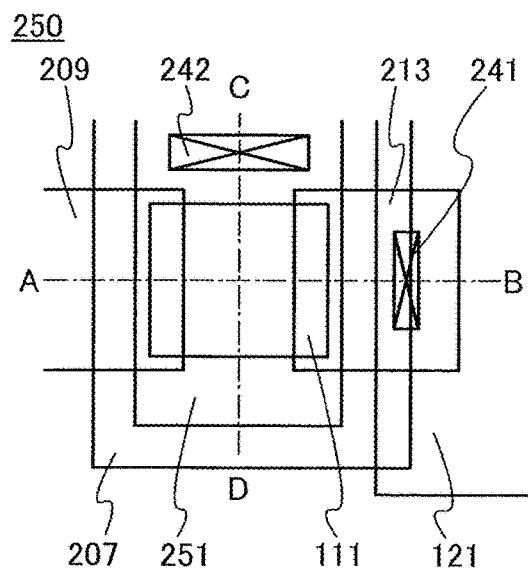
FIGS. 18A to 18C are a top view and cross-sectional views illustrating one embodiment of a transistor.
Figure 18C:
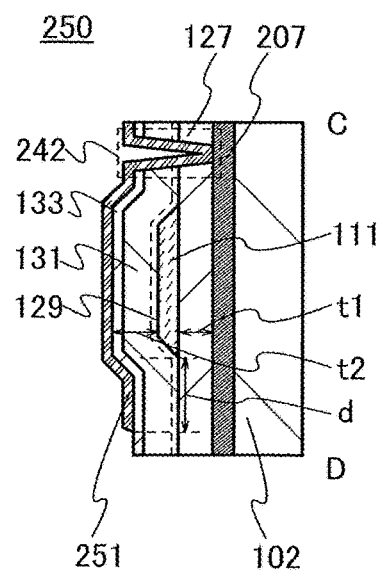
Figure 18B:
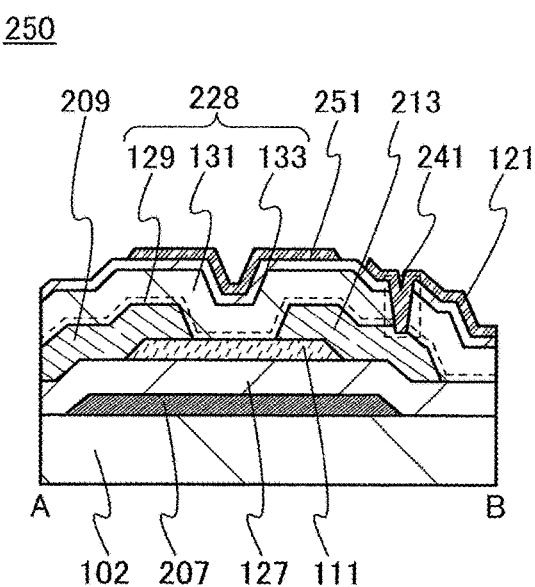

First, a transistor 250 illustrated in FIGS. 18A to 18C is described below.

FIGS. 18A to 18C are a top view and cross-sectional views of the transistor 250. FIG. 18A is a top view of the transistor 250, FIG. 18B is a cross-sectional view taken along dashed-dotted line A-B in FIG. 18A, and FIG. 18C is a cross-sectional view taken along dashed-dotted line C-D in FIG. 18A. Note that in FIG. 18A, a substrate 102, an insulating layer 127, an insulating layer 129, and an insulating layer 133 which function as gate insulating layers of the transistor 250, and the like are not illustrated for clarity.

The transistor 250 illustrated in FIGS. 18A to 18C is a channel-etched transistor and includes a gate electrode 207 provided over the substrate 102, the insulating layer 127 formed over the substrate 102 and the gate electrode 207, a semiconductor layer 111 overlapping with the gate electrode 207 with the insulating layer 127 provided therebetween, and a pair of electrodes 209 and 213 in contact with the semiconductor layer 111. Over the insulating layer 127, the semiconductor layer 111, and the pair of electrodes 209 and 213, the transistor 250 further includes a gate insulating layer 228 including the insulating layer 129, the insulating layer 131, and the insulating layer 133, and a gate electrode 251 formed over the gate insulating layer 228. The gate electrode 251 is connected to the gate electrode 207 through an opening 242 provided in the insulating layer 127 and the gate insulating layer 228. A pixel electrode 121 connected to one of the pair of electrodes 209 and 213, here the electrode 213, is formed over the gate insulating layer 228.

The gate electrode 251 is formed at the same time as the pixel electrode 121. A feature of the transistor 250 in this embodiment is that the gate electrode 251 functioning as a second gate electrode of the transistor 250 is formed in the same step as the pixel electrode 121.

The gate electrode 207 can be formed using a material and a formation method which are similar to those of the scan line 107 described in Embodiment 1. The opening 242 can be formed at the same time as an opening 241. The opening 241 can be formed by a formation method similar to that of the opening 117 described in Embodiment 1. The pair of electrodes 209 and 213 can be formed using a material and a formation method which are similar to those of the data line 109 and the conductive layer 113 described in Embodiment 1.

In the transistor 250 described in this embodiment, the semiconductor layer 111 is provided between the gate electrodes 207 and 251. In the top view as illustrated in FIG. 18A, the gate electrode 251 overlaps with side surfaces of the semiconductor layer 111 with the gate insulating layer 228 provided therebetween.

A plurality of openings are provided in the insulating layer 127 and the gate insulating layer 228. Typically, as illustrated in FIG. 18B, the opening 241 for exposing one of the pair of electrodes 209 and 213 is provided. Furthermore, as illustrated in FIG. 18C, outside a side surface on one side of the semiconductor layer 111, the gate electrode 251 is connected to the gate electrode 207 through the opening 242 provided in the insulating layer 127 and the gate insulating layer 228. The gate electrode 251 faces the side surface of the semiconductor layer 111 at a side surface of the opening 242. Outside a side surface on the other side of the semiconductor layer 111, the gate electrode 251 is not connected to the gate electrode 207. End portions on both sides of the gate electrode 251 are located outside the side surfaces on the corresponding sides of the semiconductor layer 111.

Note that in the channel width direction as illustrated in FIG. 18C, a distance d from the side surface of the semiconductor layer 111 to a projected end portion of the gate electrode 251 on the interface between the insulating layer 127 and the gate insulating layer 228 is preferably 1 to 7.5 times the sum of a thickness t1 of the insulating layer 127 and a thickness t2 of the gate insulating layer 228. In the case where the distance d is equal to or larger than the sum of the thickness t1 of the insulating layer 127 and the thickness t2 of the gate insulating layer 228, an electric field of the gate electrode 251 affects the side surface of the semiconductor layer 111 or an end portion including the side surface and its vicinity of the semiconductor layer 111, which makes it possible to suppress generation of a parasitic channel at the side surface or the end portion of the semiconductor layer 111. In the case where the distance d is smaller than or equal to 7.5 times the sum of the thickness t1 of the insulating layer 127 and the thickness t2 of the gate insulating layer 228, the area of the transistor 250 can be decreased.

In the channel width direction of the transistor 250 illustrated in FIGS. 18A to 18C, outside the side surface on one side of the semiconductor layer 111, the gate electrode 207 and the gate electrode 251 are connected to each other, and outside the side surface on the other side of the semiconductor layer 111, the gate electrode 207 and the gate electrode 251 face each other with the insulating layer 127 and the gate insulating layer 228 provided therebetween. Note that since the gate electrode 207 and the gate electrode 251 are connected to each other, the same potential can be supplied to the gate electrode 207 and the gate electrode 251. However, one embodiment of the present invention is not limited to this example. It is possible that the opening 242 is not provided and the gate electrode 207 and the gate electrode 251 are not connected to each other, so that different potentials are supplied to the gate electrode 207 and the gate electrode 251.

Figure 19A:
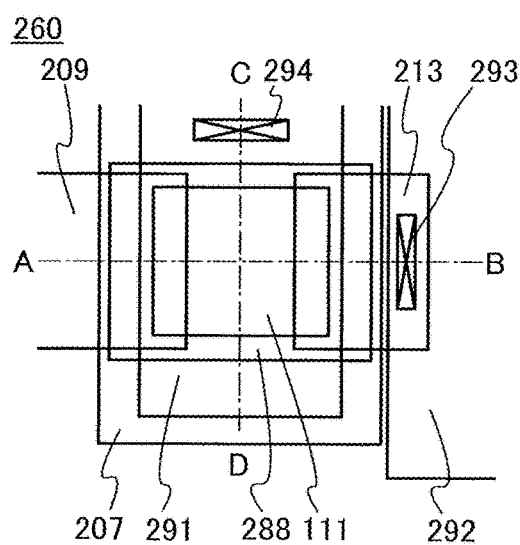
FIGS. 19A to 19C are a top view and cross-sectional views illustrating one embodiment of a transistor.
Figure 19C:
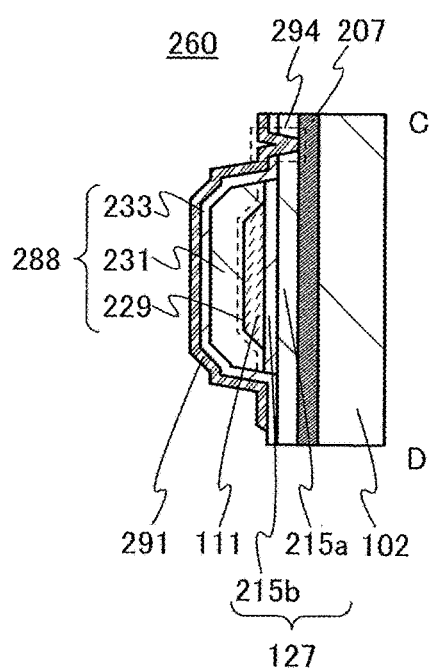
Figure 19B:
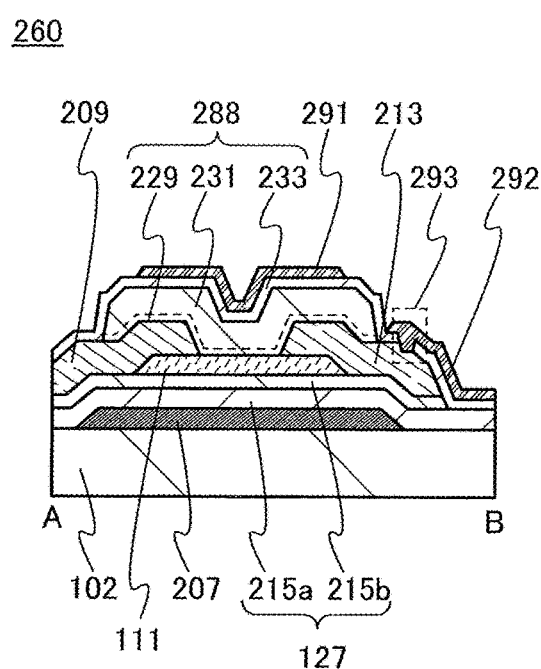

Next, a transistor 260 illustrated in FIGS. 19A to 19C is described below.

FIGS. 19A to 19C are a top view and cross-sectional views of the transistor 260. FIG. 19A is a top view of the transistor 260, FIG. 19B is a cross-sectional view taken along dashed-dotted line A-B in FIG. 19A, and FIG. 19C is a cross-sectional view taken along dashed-dotted line C-D in FIG. 19A. Note that in FIG. 19A, a substrate 102, an insulating layer 127, an oxide insulating layer 229, an oxide insulating layer 231, and a nitride insulating layer 233 which function as gate insulating layers, and the like are not illustrated for clarity.

The transistor 260 illustrated in FIGS. 19A to 19C is a channel-etched transistor and includes a gate electrode 207 provided over the substrate 102, the insulating layer 127 formed over the substrate 102 and the gate electrode 207, a semiconductor layer 111 overlapping with the gate electrode 207 with the insulating layer 127 provided therebetween, and a pair of electrodes 209 and 213 in contact with the semiconductor layer 111. Over the insulating layer 127, the semiconductor layer 111, and the pair of electrodes 209 and 213, the transistor 260 further includes a gate insulating layer 288 including the oxide insulating layer 229, the oxide insulating layer 231, and the nitride insulating layer 233 and a gate electrode 291 formed over the gate insulating layer 288. The gate electrode 291 is connected to the gate electrode 207 through an opening 294 provided in the insulating layer 127 and the nitride insulating layer 233. An electrode 292 connected to one of the pair of electrodes 209 and 213, here the electrode 213, is formed over the nitride insulating layer 233. The electrode 292 is connected to the electrode 213 through an opening 293 provided in the nitride insulating layer 233. Note that the electrode 292 functions as a pixel electrode.

The insulating layer 127 includes a nitride insulating layer 215a and an oxide insulating layer 215b. The oxide insulating layer 215b is formed in a region overlapping with the semiconductor layer 111, the pair of electrodes 209 and 213, and the oxide insulating layer 231.

The gate electrode 207 can be formed using a material and a formation method which are similar to those of the scan line 107 described in Embodiment 1. The nitride insulating layer 215a is formed using a silicon nitride film. The oxide insulating layer 215b is formed using a silicon oxide film, a silicon oxynitride film, or the like. The nitride insulating layer 215a and the oxide insulating layer 215b can be formed using a formation method similar to that of the insulating layer 127 described in Embodiment 1. The pair of electrodes 209 and 213 can be formed using a material and a formation method which are similar to those of the data line 109 and the conductive layer 113 described in Embodiment 1. The oxide insulating layer 229 can be formed as appropriate using a material and a formation method which are similar to those of the insulating layer 129 described in Embodiment 1. The oxide insulating layer 231 can be formed as appropriate using a material and a formation method which are similar to those of the insulating layer 131 described in Embodiment 1. The nitride insulating layer 233 can be formed as appropriate using a material and a formation method which are similar to those of the insulating layer 133 described in Embodiment 1. The gate electrode 291 and the electrode 292 can be formed as appropriate using a material and a formation method which are similar to those of the pixel electrode 121 described in Embodiment 1.

The oxide insulating layer 229 and the oxide insulating layer 231 are separated from those in other transistors and overlap with the semiconductor layer 111. Specifically, in the channel length direction in FIG. 19B, end portions of the oxide insulating layer 229 and the oxide insulating layer 231 are positioned over the pair of electrodes 209 and 213, and in the channel width direction in FIG. 19C, end portions of the oxide insulating layer 229 and the oxide insulating layer 231 are positioned on the outer side of the semiconductor layer 111. The nitride insulating layer 233 is formed so as to cover upper and side surfaces of the oxide insulating layer 231 and the oxide insulating layer 229 and is in contact with the nitride insulating layer 215a. Note that the end portions of the oxide insulating layer 229 and the oxide insulating layer 231 may be provided not over the pair of electrodes 209 and 213 but over the nitride insulating layer 215a in the channel length direction.

In the channel width direction in FIG. 19C, the gate electrode 291 faces a side surface of the semiconductor layer 111 with side surfaces of the oxide insulating layer 229 and the oxide insulating layer 231 positioned therebetween.

In the channel width direction of the transistor 260 described in this embodiment, the semiconductor layer 111 is provided between the gate electrode 207 and the gate electrode 291 with the insulating layer 127 provided between the semiconductor layer 111 and the gate electrode 207 and with the gate insulating layer 288 provided between the semiconductor layer 111 and the gate electrode 291. In the top view as illustrated in FIG. 19A, the gate electrode 291 overlaps with the side surfaces of the semiconductor layer 111 with the gate insulating layer 288 provided therebetween.

As illustrated in FIG. 19C, outside the side surface on one side of the semiconductor layer 111, the gate electrode 291 is connected to the gate electrode 207 through the opening 294 provided in the insulating layer 127 and the nitride insulating layer 233. The gate electrode 291 faces the side surface of the semiconductor layer 111 at side surfaces of the oxide insulating layers 229 and 231. Outside the side surface on the other side of the semiconductor layer 111, the gate electrode 291 is not connected to the gate electrode 207. End portions on both sides of the gate electrode 291 are located outside the side surfaces on the corresponding sides of the semiconductor layer 111.

Although the gate electrode 207 and the gate electrode 291 are connected to each other only outside the side surface on one side of the semiconductor layer 111 in the channel width direction of the transistor 260 as illustrated in FIG. 19C, the gate electrode 207 and the gate electrode 291 may be connected to each other outside the side surfaces on both sides of the semiconductor layer 111. Note that since the gate electrode 207 and the gate electrode 291 are connected to each other, the same potential can be supplied to the gate electrode 207 and the gate electrode 291. However, one embodiment of the present invention is not limited to this example. It is possible that the opening 294 is not provided and the gate electrode 207 and the gate electrode 291 are not connected to each other, so that different potentials are supplied to the gate electrode 207 and the gate electrode 291.

In the transistor 260 described in this embodiment, the nitride insulating layer 215a and the nitride insulating layer 233 are in contact with each other with the semiconductor layer 111 and the oxide insulating layer 231 partly provided therebetween. The nitride insulating layer 215a and the nitride insulating layer 233 in which the diffusion coefficient of oxygen is low have a barrier property against oxygen. Thus, part of oxygen contained in the oxide insulating layer 231 can be efficiently moved to the semiconductor layer 111, whereby the amount of oxygen vacancies in the semiconductor layer 111 can be reduced. The nitride insulating layer 215a and the nitride insulating layer 233 in which the diffusion coefficient of water, hydrogen, or the like is low have a barrier property against water, hydrogen, or the like. Thus, it is possible to prevent water, hydrogen, or the like from diffusing into the semiconductor layer 111 from the outside. Accordingly, the transistor 260 has high reliability.

Note that the steps for forming the transistor 260 are as follows.

First, a step similar to the step illustrated in FIG. 5C in Embodiment 1 is performed. Next, the oxide insulating layers 229 and 231 having an island shape are formed by separation at the same time as the opening 140. Then, the nitride insulating layer 233 is formed. After that, the nitride insulating layer 233 is processed; thus, the opening 293 reaching the electrode 213 is formed. In addition, the nitride insulating layer 233 and the insulating layer 127 are processed; thus, the opening 294 reaching the gate electrode 207 is formed at the same time as the opening 293. After that, a conductive layer is formed over the nitride insulating layer 233 and is processed; thus, the gate electrode 291 and the electrode 292 functioning as a pixel electrode are formed.

(Embodiment 5)

In this embodiment, one structure of the driver circuit portion 304 of the display device described in Embodiment 3 is described with reference to FIGS. 20A and 20B and FIGS. 21A and 21B. The driver circuit portion 304 can be manufactured using any of the transistors described in Embodiments 1 and 4 as appropriate. Here, an example of the driver circuit portion 304 is described using a buffer formed in the gate driver 304a.

Figure 20A:
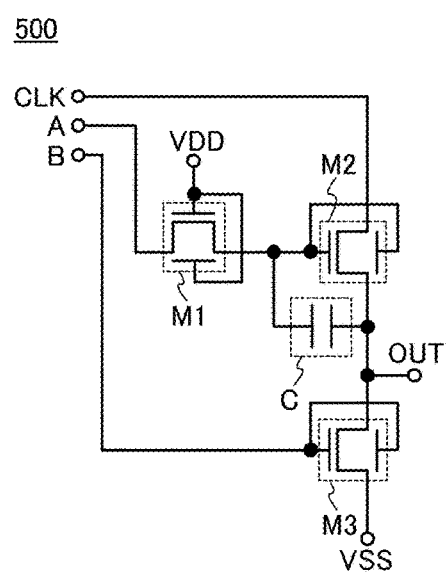
FIGS. 20A and 20B are a circuit diagram and a top view illustrating one example of a driver circuit of a display device of one embodiment of the present invention.

FIG. 20A is a circuit diagram of a buffer 500. The buffer 500 includes transistors M1 to M3 and a capacitor C. A gate of the transistor M1 is connected to a wiring to which a potential VDD is supplied. One of a source and a drain of the transistor M1 is connected to a terminal A, and the other of the source and the drain of the transistor M1 is connected to a gate of the transistor M2. One of a source and a drain of the transistor M2 is connected to an output terminal OUT of the buffer 500, and the other of the source and the drain of the transistor M2 is connected to a wiring to which a signal CLK is input. A gate of the transistor M3 is connected to a terminal B. One of a source and a drain of the transistor M3 is connected to a wiring to which a potential VSS is supplied, and the other of the source and the drain is connected to the output terminal OUT. One of a pair of electrodes of the capacitor C is connected to the other of the source and the drain of the transistor M1 and the gate of the transistor M2, and the other of the pair of electrodes of the capacitor C is connected to the other of the source and the drain of the transistor M3 and the output terminal OUT.

In the buffer described in this embodiment, any of the transistors described in Embodiments 1 and 4 can be used as the transistors M1 to M3 as appropriate.

Figure 20B:
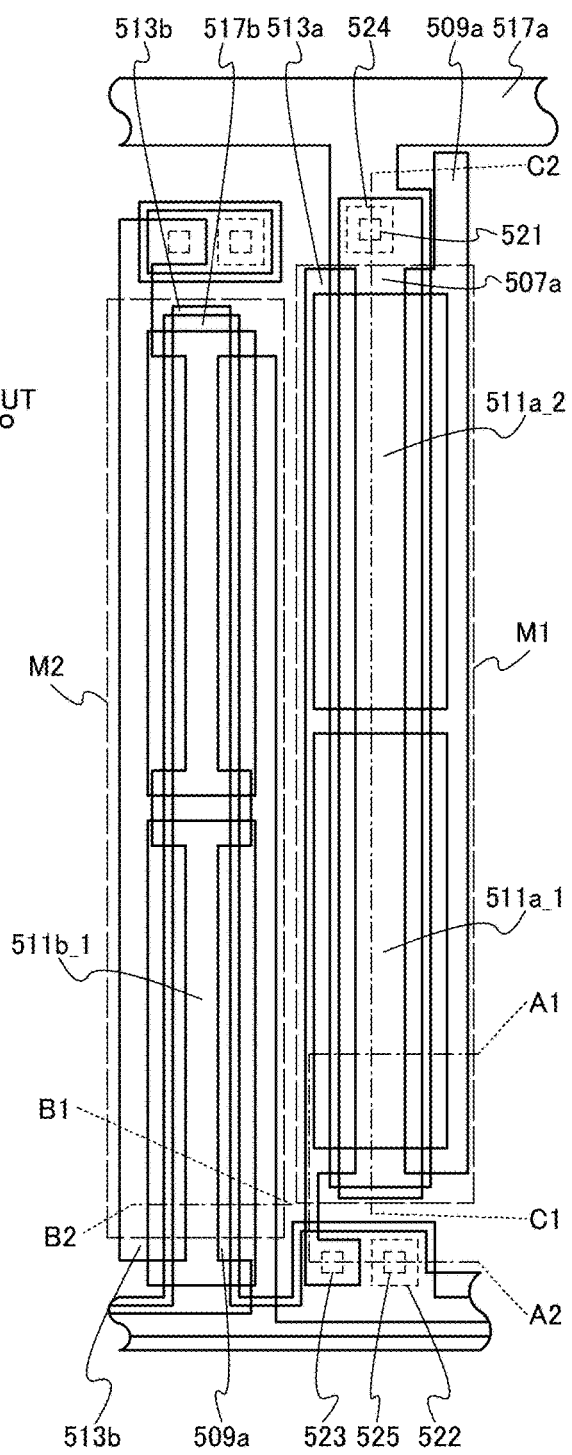
Figure 21A:
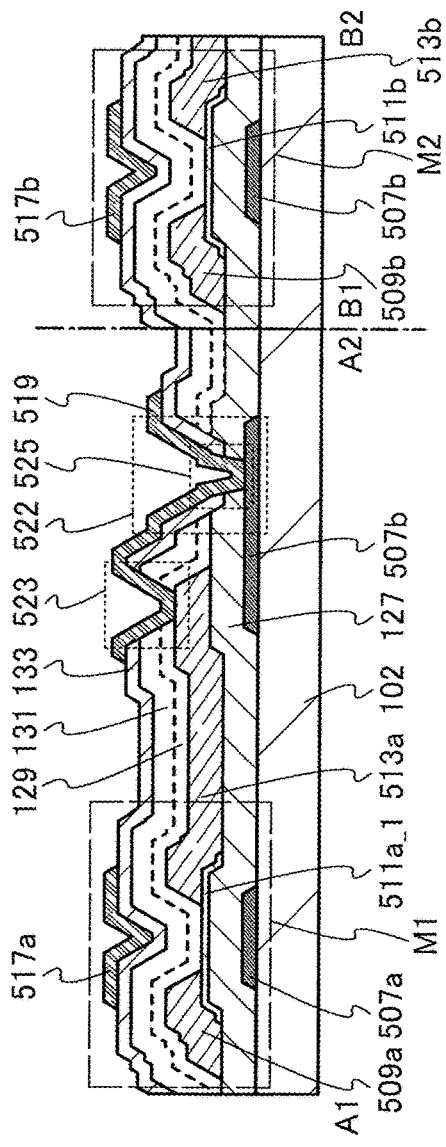
FIGS. 21A and 21B are cross-sectional views illustrating one example of a driver circuit of a display device of one embodiment of the present invention.
Figure 21B:
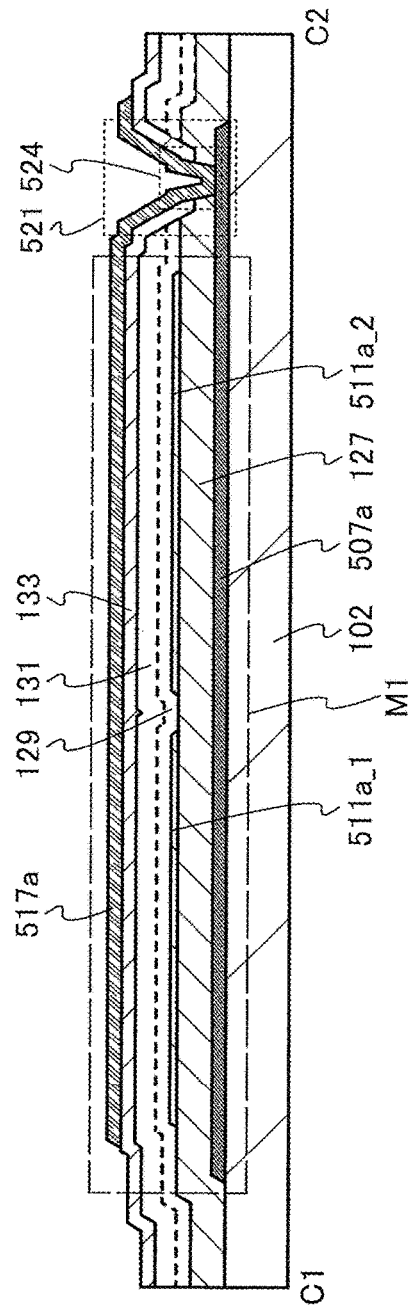

Next, structures of the transistors M1 and M2 are described. FIG. 20B illustrates a top view of the transistors M1 and M2. A cross-sectional view taken along dashed-dotted lines A1-A2 and B1-B2 in the top view is illustrated in FIG. 21A, and a cross-sectional view taken along dashed-dotted line C1-C2 is illustrated in FIG. 21B. Note that FIG. 21A illustrates a cross-sectional view of the transistors M1 and M2 in the channel direction, and FIG. 21B illustrates a cross-sectional view of the transistor M1 in the channel width direction.

A cross-sectional structure of the transistor M1 illustrated in FIGS. 21A and 21B is as follows.

A conductive layer 507a serving as a first gate electrode of the transistor M1 is provided over a substrate 102. An insulating layer 127 serving as a gate insulating layer of the transistor M1 is provided over the conductive layer 507a. Semiconductor layers 511a_1 and 511a_2 are provided over the insulating layer 127 so as to overlap with the conductive layer 507a, and serve as semiconductor layers of the transistor M1. A conductive layer 509a serving as a source electrode of the transistor M1 and a conductive layer 513a serving as a drain electrode of the transistor M1 are provided over the semiconductor layers 511a_1 and 511a_2 and the insulating layer 127. Insulating layers 129 and 131 serving as a protective insulating layer of the transistor M1 are provided over the conductive layer 509a, the semiconductor layers 511a_1 and 511a_2, the conductive layer 513a, and the insulating layer 127. An insulating layer 133 is formed over the insulating layer 131, and a conductive layer 517a serving as a second gate electrode of the transistor M1 is formed over the insulating layer 133. An opening 523 reaching the conductive layer 513a is provided in the insulating layers 129, 131, and 133. Openings 521 and 522 reaching the insulating layer 127 are provided in the insulating layers 129 and 131. The insulating layer 133 is formed so as to cover the openings 521 and 522, and an opening 524 reaching the conductive layer 507a and an opening 525 reaching a conductive layer 507b are provided in the insulating layer 127 and the insulating layer 133. The conductive layer 517a is provided over the insulating layer 133 and the openings 521 and 524. That is, the conductive layer 517a serving as the second gate electrode has the same potential as the conductive layer 507a serving as the first gate electrode. A conductive layer 519 is provided over the insulating layer 133 and the openings 522, 523, and 525. That is, the conductive layer 513a serving as the drain electrode of the transistor M1 and the conductive layer 507b serving as a first gate electrode of the transistor M2 are connected through the conductive layer 519.

FIG. 21B is a cross-sectional view of the transistor M1 in the channel width direction. In this embodiment, the transistor M1 is formed using the transistor 250 described in Embodiment 4, and an end portion of the conductive layer 517a serving as the gate electrode is located on the outer side of an end portion of the semiconductor layer 511a_1.

The conductive layer 507b serving as the first gate electrode of the transistor M2 is provided over the substrate 102. The insulating layer 127 serving as a gate insulating layer of the transistor M2 is provided over the conductive layer 507b. A semiconductor layer 511b is provided over the insulating layer 127 so as to overlap with the conductive layer 507b, and serve as a semiconductor layer of the transistor M2. A conductive layer 509b serving as a source electrode of the transistor M2 and a conductive layer 513b serving as a drain electrode of the transistor M2 are provided over the semiconductor layer 511b and the insulating layer 127. The insulating layers 129 and 131 serving as a protective insulating layer of the transistor M2 are provided over the conductive layer 509b, the semiconductor layer 511b, the conductive layer 513b, and the insulating layer 127. The insulating layer 133 is formed over the insulating layer 131, and a conductive layer 517b serving as a second gate electrode of the transistor M2 is formed over the insulating layer 133. Although not illustrated, the conductive layer 507b and the conductive layer 517b are connected through an opening provided in the insulating layer 127, the insulating layer 129, the insulating layer 131, and the insulating layer 133. That is, the conductive layer 517b serving as the second gate electrode has the same potential as the conductive layer 507b serving as the first gate electrode.

Next, a method for manufacturing the transistors M1 and M2 is described with reference to FIGS. 5A to 7B, which are described in Embodiment 1, and FIGS. 21A and 21B.

By the same process as the scan line 107 which is illustrated in FIG. 5A, the conductive layers 507a and 507b are formed over the substrate 102. Next, the insulating layer 127 is formed. Then, by the same process as the semiconductor layers 111 and 119 which is illustrated in FIG. 5A, the semiconductor layers 511a_1, 511a_2, and 511b are formed.

Next, by the same process as the data line 109 and the conductive layer 113 which is illustrated in FIG. 5B, the conductive layers 509a, 513a, 509b, and 513b are formed over the insulating layer 127 and the semiconductor layers 511a_1, 511a_2, and 511b.

Next, the insulating layer 129 and the insulating layer 131 are formed as illustrated in FIG. 5C.

Figure 6A:
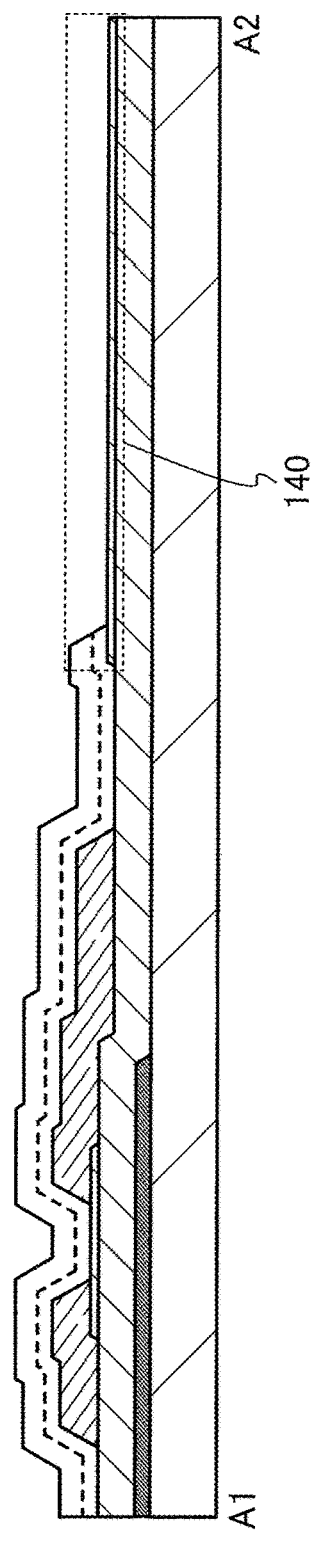
FIGS. 6A and 6B are cross-sectional views illustrating a method for manufacturing a display device of one embodiment of the present invention.

Next, by the same process as the opening 140 which is illustrated in FIG. 6A, the opening 521 and the opening 522 are formed.

Figure 6B:
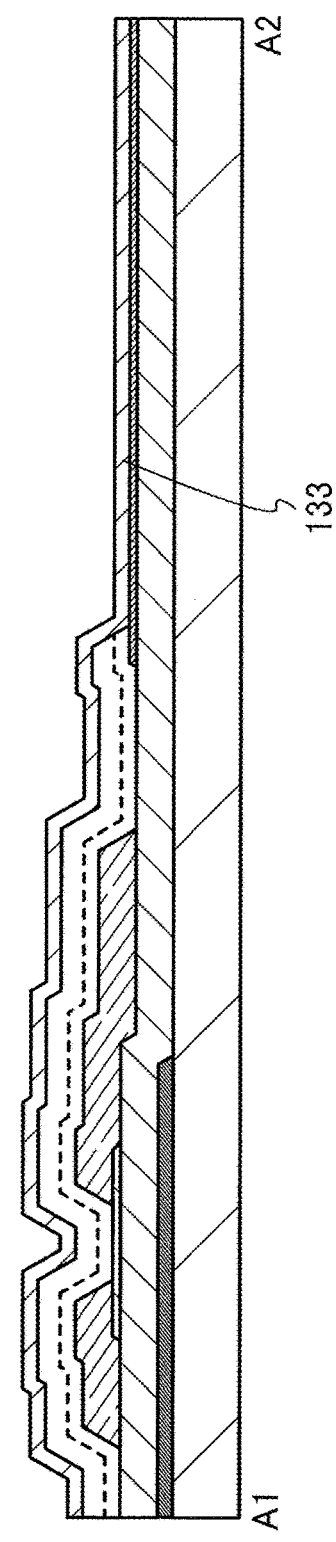

Next, the insulating layer 133 is formed as illustrated in FIG. 6B.

Figure 7A:
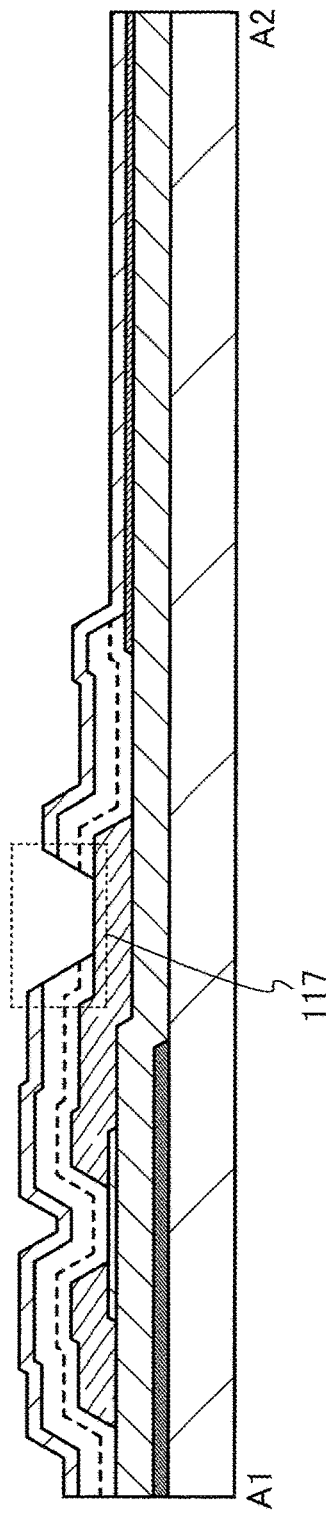
FIGS. 7A and 7B are cross-sectional views illustrating a method for manufacturing a display device of one embodiment of the present invention.

Next, by the same process as the opening 117 which is illustrated in FIG. 7A, the opening 523, the opening 524, and the opening 525 are formed.

Figure 7B:
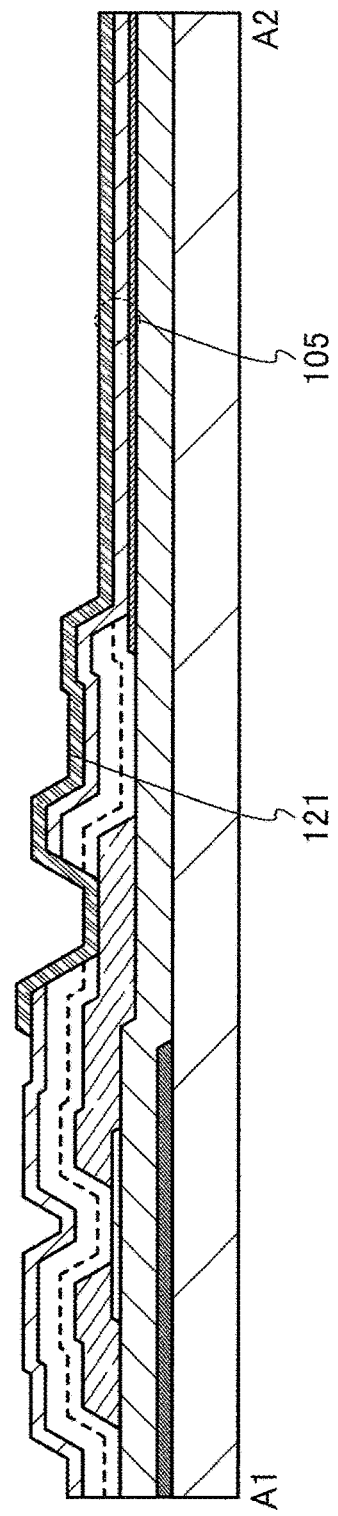

Next, by the same process as the pixel electrode 121 which is illustrated in FIG. 7B, the conductive layer 517*a*, the conductive layer 517*b*, and the conductive layer 519 are formed.

Through the above process, the transistor M1 and the transistor M2 can be manufactured.

When the transistors M1 to M3 are manufactured using transistors including a pair of gate electrodes which overlap with each other with a semiconductor layer provided therebetween and which have the same potential as described in Embodiment 4, a channel formation region in the semiconductor layer of each transistor is enlarged and drain currents of the transistors M1 to M3 can be increased. Thus, while a decrease in on-state current is suppressed, the sizes of the transistors M1 to M3 can be decreased, and therefore, the area of the buffer 500 and hence that of a driver circuit including the buffer 500 can be decreased. The transistor M2 provided on the output side of the buffer 500 should have a higher current supply capability than that of the transistor M1. In the case where the transistor M2 includes such a pair of gate electrodes as described above, the effect in decreasing the area of the buffer 500 or the driver circuit is particularly larger than in the case where the transistor M1 has the same structure.

(Embodiment 6)

In this embodiment, a display module and electronic devices that can be formed using a display device of one embodiment of the present invention are described with reference to FIG. 13 and FIGS. 14A to 14H.

Figure 13:
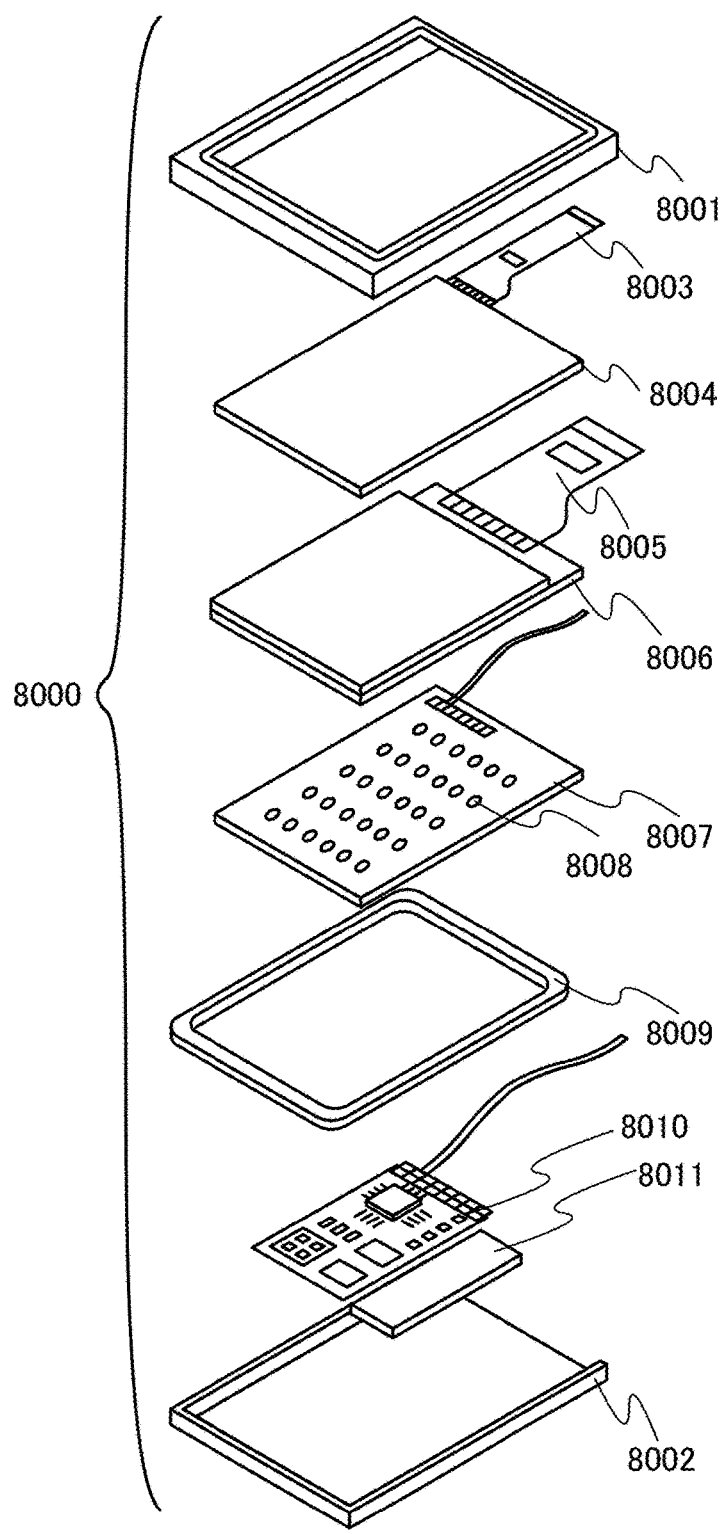
FIG. 13 illustrates a display module.

In a display module 8000 illustrated in FIG. 13, a touch panel 8004 connected to an FPC 8003, a display panel 8006 connected to an FPC 8005, a backlight 8007, a frame 8009, a printed board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and can be formed to overlap with the display panel 8006. A counter substrate (sealing substrate) of the display panel 8006 can have a touch panel function. A photosensor may be provided in each pixel of the display panel 8006 to form an optical touch panel.

The backlight 8007 includes a light source 8008. The light source 8008 may be provided at an end portion of the backlight 8007 and a light diffusing plate may be used.

The frame 8009 protects the display panel 8006 and also functions as an electromagnetic shield for blocking electromagnetic waves generated by the operation of the printed board 8010. The frame 8009 may function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

FIGS. 14A to 14H illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring or sensing force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 14A:
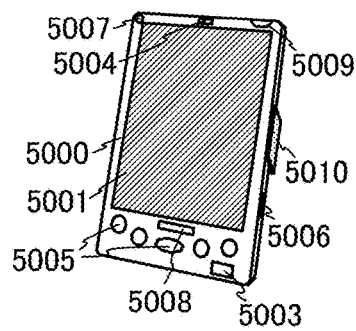
FIGS. 14A to 14H illustrate electronic devices.
Figure 14B:
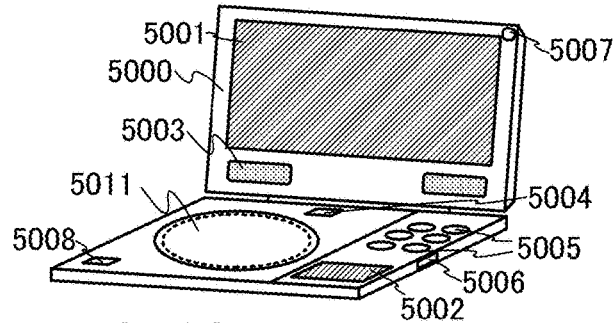
Figure 14C:
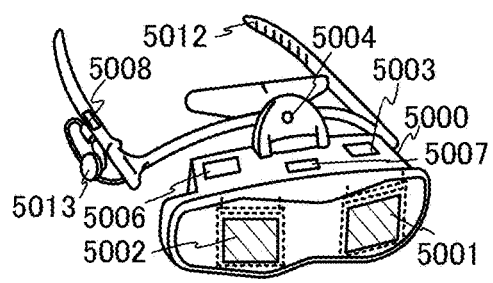
Figure 14D:
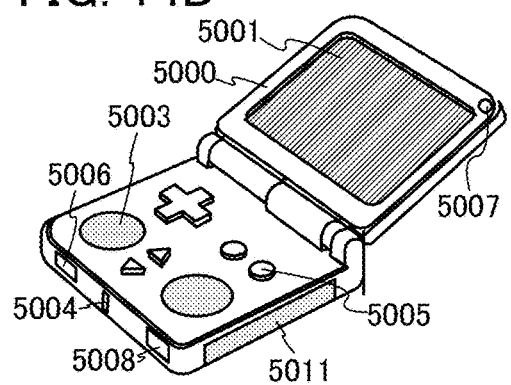
Figure 14E:
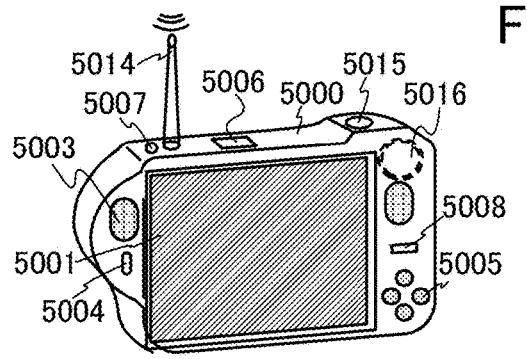
Figure 14F:
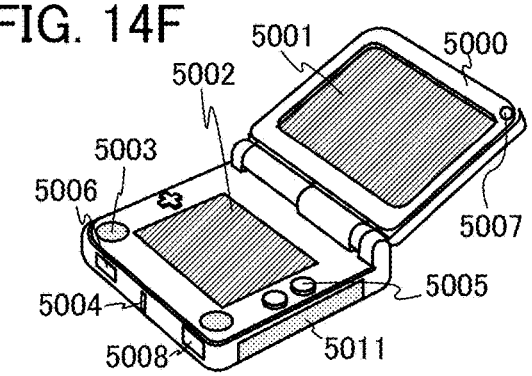
Figure 14G:
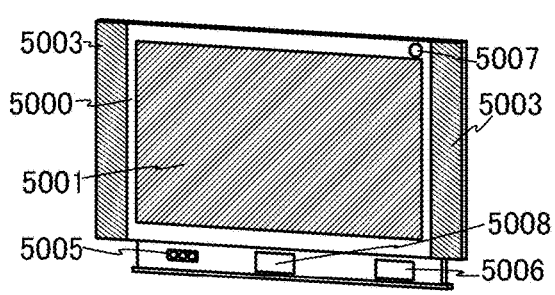
Figure 14H:
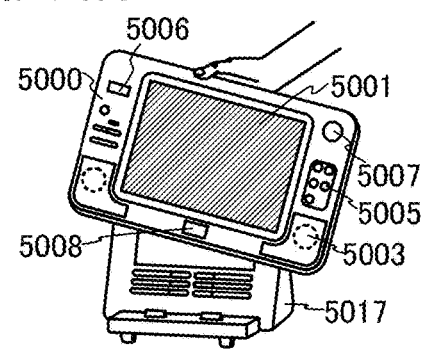

FIG. 14A illustrates a mobile computer that can include a switch 5009, an infrared port 5010, and the like in addition to the above components. FIG. 14B illustrates a portable image reproducing device (e.g., a DVD player) that is provided with a memory medium and can include a second display portion 5002, a memory medium reading portion 5011, and the like in addition to the above components. FIG. 14C illustrates a goggle-type display that can include the second display portion 5002, a support 5012, an earphone 5013, and the like in addition to the above components. FIG. 14D illustrates a portable game machine that can include the memory medium reading portion 5011 and the like in addition to the above components. FIG. 14E illustrates a digital camera that has a television reception function and can include an antenna 5014, a shutter button 5015, an image receiving portion 5016, and the like in addition to the above components. FIG. 14F illustrates a portable game machine that can include the second display portion 5002, the memory medium reading portion 5011, and the like in addition to the above components. FIG. 14G illustrates a television receiver that can include a tuner, an image processing portion, and the like in addition to the above components. FIG. 14H illustrates a portable television receiver that can include a charger 5017 capable of transmitting and receiving signals, and the like in addition to the above components.

The electronic devices illustrated in FIGS. 14A to 14H can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Further, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of shooting a still image, a function of taking a moving image, a function of automatically or manually correcting a shot image, a function of storing a shot image in a memory medium (an external memory medium or a memory medium incorporated in the camera), a function of displaying a shot image on the display portion, or the like. Note that functions that can be provided for the electronic devices illustrated in FIGS. 14A to 14H are not limited to those described above, and the electronic devices can have a variety of functions.

The electronic devices described in this embodiment each include the display portion for displaying some sort of data.

The structure described in this embodiment can be used as appropriate in combination with any of the structures described in the other embodiments.

[Example 1]

In this example, the transmittance of a display device of one embodiment of the present invention was calculated. The structure of the display device used for the calculation in this example is described below with reference to FIG. 15.

Figure 15:
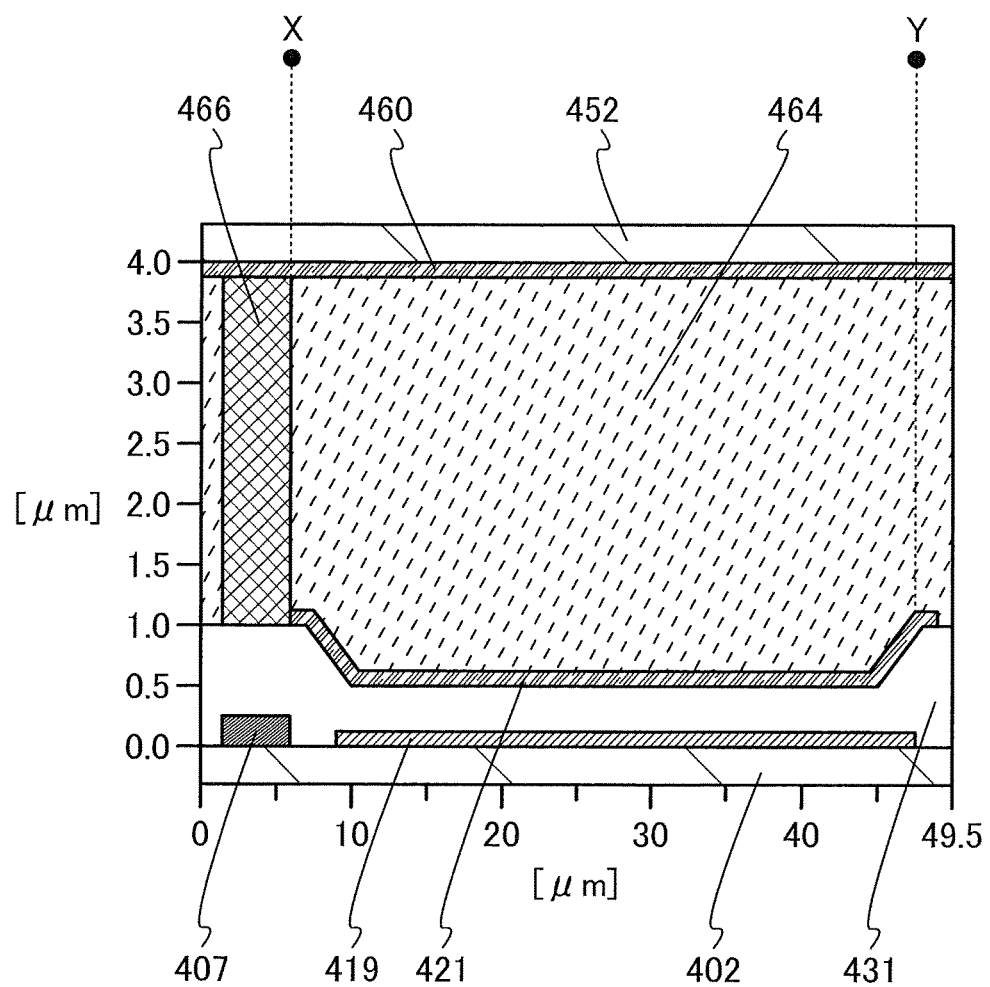
FIG. 15 is a cross-sectional view illustrating a display device structure used for calculation in an example.

The display device illustrated in FIG. 15 and used for the calculation includes a substrate 402, conductive layers 407 and 419 over the substrate 402, an insulating layer 431 over the substrate 402 and the conductive layers 407 and 419, a spacer 466 over the insulating layer 431, an electrode 421 over the insulating layer 431, an electrode 460 over the spacer 466, a substrate 452 over the electrode 460, and a liquid crystal layer 464 between the electrode 421 and the electrode 460.

The electrode 421 is provided along a depressed portion formed in the insulating layer 431. Therefore, the electrode 421 has a depressed portion. One end portion of the spacer 466 is denoted by X, and one end portion of the depressed portion of the electrode 421 is denoted by Y.

Note that the structure of the display device illustrated in FIG. 15 and used for the calculation is a simplified structure of the display device of one embodiment of the present invention illustrated in FIG. 3 for the sake of simple calculation. Specifically, the substrate 402 corresponds to the substrate 102 illustrated in FIG. 3 over which the transistor 103 is formed. The conductive layer 407 corresponds to the scan line 107 illustrated in FIG. 3. The conductive layer 419 corresponds to the semiconductor layer 119 illustrated in FIG. 3. The insulating layer 431 corresponds to the insulating layer 131 illustrated in FIG. 3. The spacer 466 corresponds to the spacer 166 illustrated in FIG. 3. The pixel electrode 421 corresponds to the pixel electrode 121 illustrated in FIG. 3. The electrode 460 corresponds to the conductive layer 160 illustrated in FIG. 3. The substrate 452 corresponds to the substrate 152 illustrated in FIG. 3. The liquid crystal layer 464 corresponds to the liquid crystal layer 164 illustrated in FIG. 3.

Numerical values 0, 10, 20, 30, 40, and 49.5 (μm) in FIG. 15 represent distances in the horizontal direction in the above-described structure used for the calculation. Numerical values 0.0, 0.5, 1.0, 1.5, 2.0, 2.5, 3.0, 3.5, and 4.0 (μm) in FIG. 15 represent distances in the vertical direction in the above-described structure used for the calculation. Specifically, the depth (the distance in the vertical direction) of the depressed portion formed in the insulating layer 431 is 0.5 μm. The taper angle of the depressed portion is 15°. The thickness of the electrodes 421 and 460 is 0.1 μm.

The resolution of the display device illustrated in FIG. 15 and used for the calculation was set to three values of 326 ppi, 353 ppi, and 513 ppi in the calculation. Note that in the case where the resolution was 326 ppi, the distance in the horizontal direction in the structure of the display device illustrated in FIG. 15 was set to 78 μm; in the case where the resolution was 353 ppi, the distance in the horizontal direction in the structure of the display device illustrated in FIG. 15 was set to 72 μm; and in the case where the resolution was 513 ppi, the distance in the horizontal direction in the structure of the display device illustrated in FIG. 15 was set to 49.5 μm.

The voltages applied to the conductive layers and the electrodes illustrated in FIG. 15 were set as follows: the conductive layer 407, −9 V; the conductive layer 419, 0 V; the electrode 421, 5 V; and the electrode 460, 0 V. A liquid crystal material of the liquid crystal layer 464 was assumed to be MLC-2039 (produced by Merck).

Under the above conditions, the transmittances of the liquid crystal layer 464 at different times were calculated. Note that LCD Master (produced by SHINTECH, Inc.) was used as calculation software.

Figure 16:
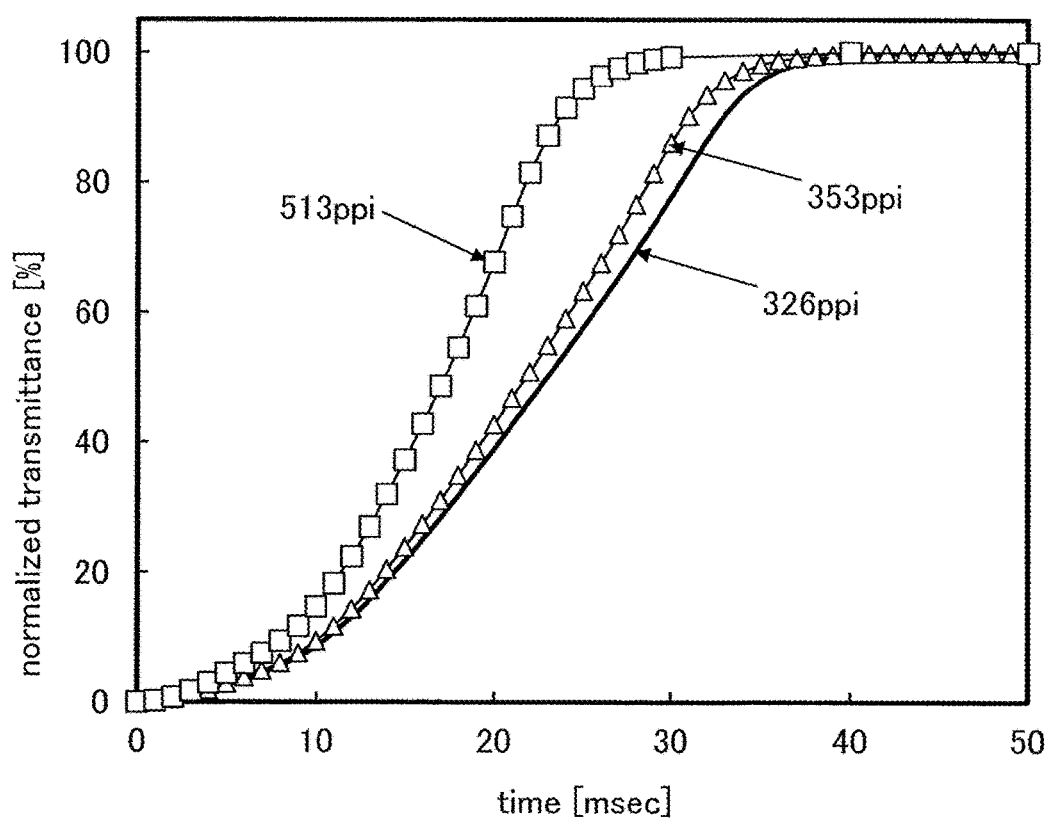
FIG. 16 shows results of calculation of transmittances.

FIG. 16 shows results of calculation of the transmittances. In FIG. 16, the horizontal axis represents time (msec) and the vertical axis represents normalized transmittance (%).

The calculation results in FIG. 16 show that in the structure of the display device illustrated in FIG. 15, the normalized transmittance rises in a shorter time as the resolution increases. This implies that the response speed of the liquid crystal layer 464 increases as the resolution increases in the structure of the display device illustrated in FIG. 15.

Next, changes of the transmittance of the liquid crystal layer over time in the structure of the display device illustrated in FIG. 15 and used for the calculation were calculated. Note that the transmittances of the liquid crystal layer 464 after 0 msec, 5 msec, 10 msec, 15 msec, 20 msec, 25 msec, and 30 msec were calculated with the resolution set to 513 ppi (the distance in the horizontal direction set to 49.5 μm). Note that the other conditions for the calculation were similar to those described above.

Figure 17:
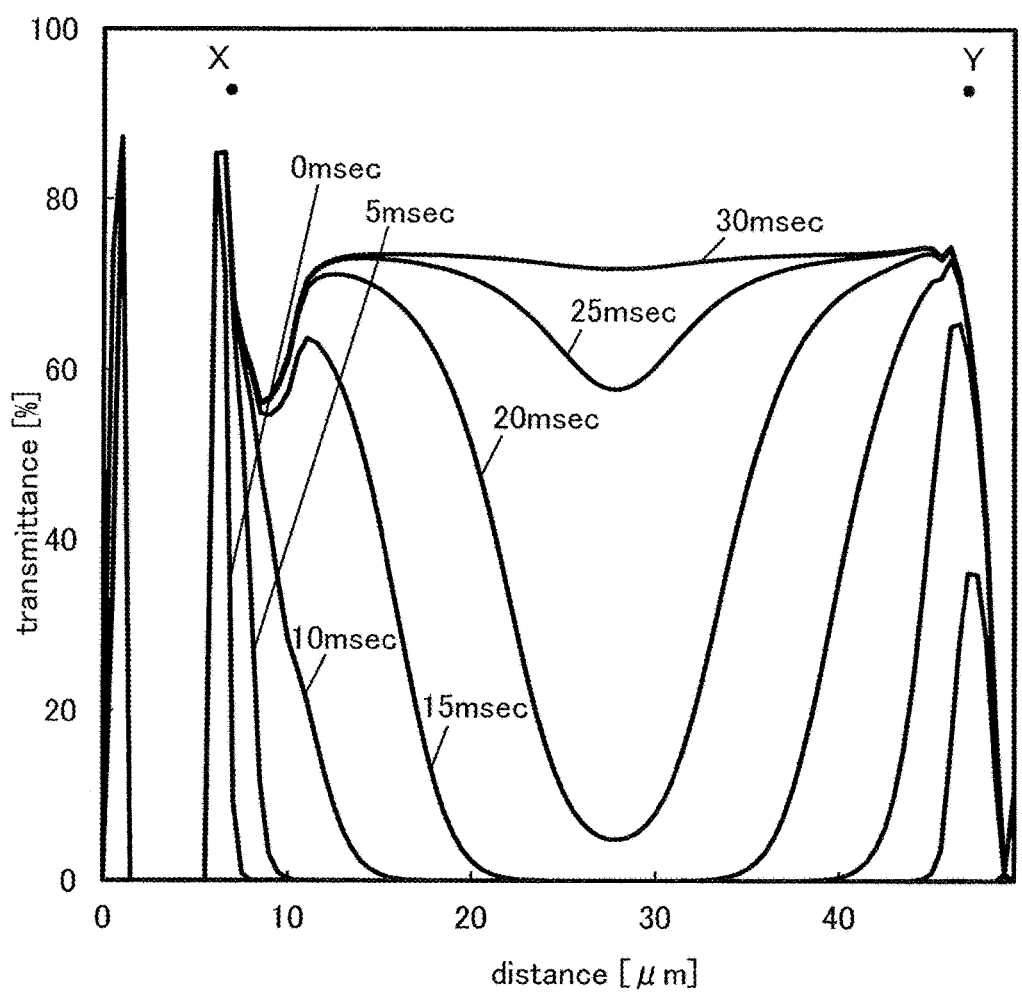
FIG. 17 shows results of calculation of transmittances.

FIG. 17 shows the results of calculation of the transmittances. In FIG. 17, the horizontal axis represents distance (μm) and the vertical axis represents transmittance (%). In addition, in FIG. 17, X and Y indicate portions corresponding to X and Y in FIG. 15.

The calculation results shown in FIG. 17 confirm that the transmittance increases over time from two points of X (end portion of the spacer 466) and Y (end portion of the depressed portion of the electrode 421) as starting points toward the middle of the pixel. Thus, the points X and Y are origins of alignment control, which implies that the response speed increases as the distance between X and Y decreases. In other words, as the resolution of the display device increases, the structure of the display device of one embodiment of the present invention becomes more effective.

The structure described in this example can be used as appropriate in combination with any of the structures described in the other embodiments.

[Example 2]

In this example, a display device of one embodiment of the present invention was manufactured and evaluated. One embodiment of the display device manufactured in this example is described below.

First, specifications of the display device manufactured in this example are shown in Table 1.

TABLE 1

| | |
|---|---|
| Backplane | CAAC-IGZO |
| Panel size | 4.3 inches |
| Number of effective pixels | 1080 × RGB (H) × 1920 (V): FHD |
| Pixel size | 16.5 μm (H) × 49.5 μm (V) |
| External panel size | 55.46 mm (H) × 137.96 mm (V) |
| Display region | 53.46 mm (H) × 95.04 mm (V) |
| Resolution | 513 ppi |
| Number of masks | 6 (CE transistor) |
| LCD | Vertical electric field liquid crystal |
| Coloring method | CF |
| Aperture ratio | 50.3% |
| Drive frequency | 60 Hz |

TABLE 1-continued

| Video signal format | Analog line sequential |
|---|---|
| Gate driver | Built-in (driver width: 0.72 mm) (bezel width: 1.0 mm) |
| Source driver | COF (bezel width: 4.3 mm) |

As shown in Table 1, CAAC-IGZO was used in a backplane. The panel size was 4.3 inches. The number of effective pixels was 1080×RGB (H)×1920 (V) which corresponds to full high definition (FHD). The pixel size was 16.5 µm (H)×49.5 µm (V). The external panel size was 55.46 mm (H)×137.96 mm (V). The display region was 53.46 mm (H)×95.04 mm (V). The resolution was 513 ppi. The number of masks was six and a channel-etched (CE) transistor was used. A vertical electric field liquid crystal was used in the LCD. A color filter (CF) method was used as the coloring method. The aperture ratio was 50.3%. The drive frequency was 60 Hz. The video signal format was analog line sequential. The gate driver was built-in, the driver width was 0.72 mm, and the bezel width was 1.0 mm. The source driver was chip on film (COF), and the bezel width was 4.3 mm.

Note that the pixel structure was similar to that shown in the top view illustrated in FIG. 1 and the cross-sectional views illustrated in FIGS. 2 to 4.

Figure 22:
FIG. 22 shows display of a display device of an example.

FIG. 22 shows a result of display on the display device of one embodiment of the present invention which was manufactured in this example. As shown in FIG. 22, excellent display on the display device of one embodiment of the present invention has been confirmed.

Next, the state of liquid crystal alignment in a pixel portion was observed using a test element group (TEG) substrate having the same structure as that of the display device shown in FIG. 22. Note that a black matrix (BM) and a color filter (CF) were not provided in the TEG substrate for easy observation of the state of liquid crystal alignment in the pixel portion.

Note that the state of liquid crystal alignment was observed using a polarizing microscope under crossed nicols, and a reflection image and a transmission image were observed.

Figure 23A:
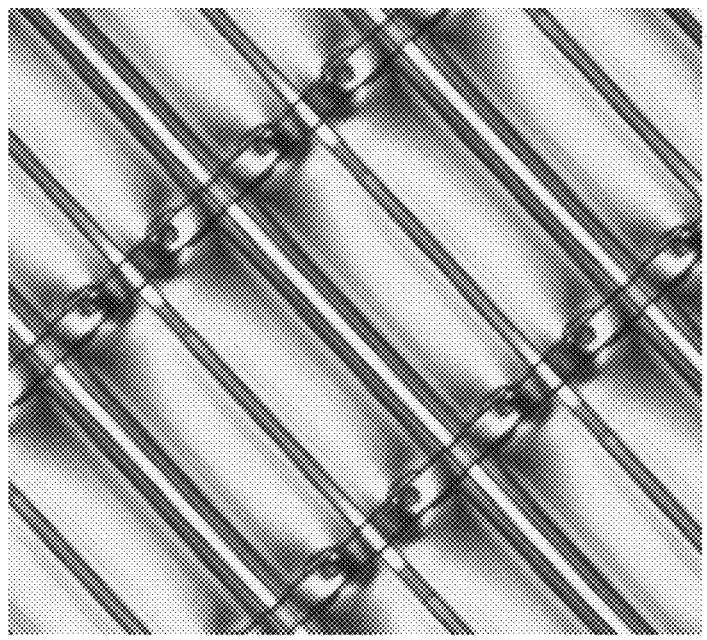
FIGS. 23A and 23B show results of observation of pixels of an example.
Figure 23B:
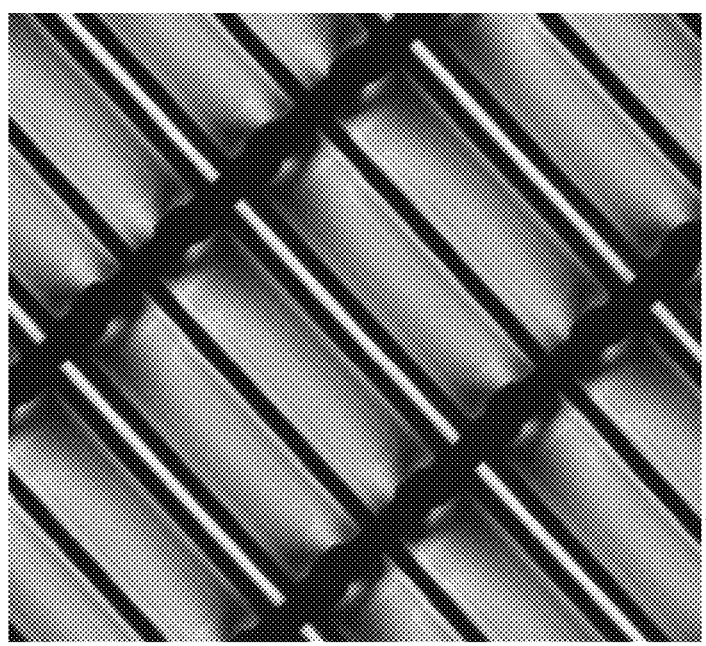

FIGS. 23A and 23B show observation results of states of liquid crystal alignment. Note that FIG. 23A shows the observation result of state of liquid crystal alignment in the reflection image, and FIG. 23B shows the observation result of state of liquid crystal alignment in the transmission image.

As shown in FIGS. 23A and 23B, favorable alignment states without defective alignment have been confirmed.

As described above, it has been confirmed in this example that the 4.3-inch high-resolution (513 ppi) FHD liquid crystal display device can be manufactured with six masks.

This application is based on Japanese Patent Application serial no. 2013-118550 filed with Japan Patent Office on Jun. 5, 2013, Japanese Patent Application serial no. 2013-122849 filed with Japan Patent Office on Jun. 11, 2013, and Japanese Patent Application serial no. 2014-037205 filed with Japan Patent Office on Feb. 27, 2014, the entire contents of which are hereby incorporated by reference.

What is claimed is:

1. A display device comprising:
a first pixel comprising:
a first pixel electrode;
a first counter electrode;
a first liquid crystal layer between the first pixel electrode and the first counter electrode;
a first spacer in the first liquid crystal layer and between the first pixel electrode and the first counter electrode; and
a first transistor electrically connected to the first pixel electrode;
a second pixel comprising:
a second pixel electrode;
a second counter electrode;
a second liquid crystal layer between the second pixel electrode and the second counter electrode;
a second spacer in the second liquid crystal layer and between the second pixel electrode and the second counter electrode; and
a second transistor electrically connected to the second pixel electrode;
a capacitor line between the first pixel and the second pixel; and
an insulating layer over the first transistor and the second transistor, the insulating layer having an opening,
wherein the first pixel electrode and the second pixel electrode are provided over the insulating layer and overlap with the opening,
wherein the first pixel electrode includes a first depressed portion along the opening,
wherein the second pixel electrode includes a second depressed portion along the opening,
wherein the first pixel electrode and the second pixel electrode do not overlap with the capacitor line, and
wherein the capacitor line overlaps with the opening.

2. The display device according to claim 1,
wherein the first spacer and the first depressed portion do not overlap with each other, and
wherein the second spacer and the second depressed portion do not overlap with each other.

3. The display device according to claim 1, further comprising a pair of alignment films facing each other with the first liquid crystal layer and the second liquid crystal layer provided therebetween.

4. The display device according to claim 1,
wherein alignment in the first liquid crystal layer is controlled by the first depressed portion and the first spacer, and
wherein alignment in the second liquid crystal layer is controlled by the second depressed portion and the second spacer.

5. The display device according to claim 1,
wherein the first pixel comprises a first capacitor comprising:
the first pixel electrode; and
a conductive layer having a light-transmitting property,
wherein the second pixel comprises a second capacitor comprising:
the second pixel electrode; and
the conductive layer having a light-transmitting property,
wherein the conductive layer includes a first region overlapping with the capacitor line, and
wherein the opening includes a second region overlapping with the first region.

6. The display device according to claim 5, wherein the first capacitor and the second capacitor are located symmetrically with respect to the capacitor line.

7. The display device according to claim 5,
wherein the first transistor and the second transistor each comprise a channel formation region in an oxide semiconductor layer, and wherein the oxide semiconductor layer and the conductive layer are provided over a same surface and include a same material.

8. An electronic device comprising the display device according to claim 1.

\* \* \* \* \*